(12) United States Patent
Lee

(10) Patent No.: US 9,983,389 B2
(45) Date of Patent: May 29, 2018

(54) OPTICAL LENS ASSEMBLY AND ELECTRONIC APPARATUS INCLUDING THE SAME

(71) Applicant: Samsung Electronics Co., Ltd., Gyeonggi-do (KR)

(72) Inventor: Tae-kun Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days. days.

(21) Appl. No.: 15/426,191

(22) Filed: Feb. 7, 2017

(65) Prior Publication Data

US 2017/0242220 A1 Aug. 24, 2017

(30) Foreign Application Priority Data

Feb. 19, 2016 (KR) .................. 10-2016-0019966

(51) Int. Cl.
*G02B 13/00* (2006.01)
*G02B 9/64* (2006.01)
*G02B 9/00* (2006.01)

(52) U.S. Cl.
CPC ............ *G02B 13/006* (2013.01); *G02B 9/64* (2013.01); *G02B 13/0045* (2013.01); *G02B 9/00* (2013.01); *G02B 13/00* (2013.01)

(58) Field of Classification Search
CPC .. G02B 13/006; G02B 13/00; G02B 13/0045; G02B 9/64; G02B 9/00
USPC ........................................ 359/708, 691, 692
See application file for complete search history.

(56) References Cited

U.S. PATENT DOCUMENTS

| 6,989,941 B2 * | 1/2006 | Tomioka | G02B 15/177 359/680 |
| 7,046,454 B2 * | 5/2006 | Tomioka | G02B 15/177 359/682 |
| 7,050,240 B2 * | 5/2006 | Tomioka | G02B 15/177 359/680 |
| 8,441,746 B2 | 5/2013 | Hsieh et al. | |
| 8,867,147 B2 * | 10/2014 | Kimura | G02B 13/04 359/691 |

(Continued)

FOREIGN PATENT DOCUMENTS

| JP | 2006255409 A | 9/2006 |
| JP | 5798215 B2 | 10/2015 |

*Primary Examiner* — William R Alexander
(74) *Attorney, Agent, or Firm* — Cha & Reiter, LLC

(57) ABSTRACT

Disclosed are an optical lens assembly and an electronic apparatus including the disclosed lens assembly. The optical lens assembly includes a first lens group having positive refractive power, an iris diaphragm, and a second lens group having positive refractive power, which are arranged from an object side to an image side of an optical axis, the object side facing an object for image capture and the image side facing an imaging surface of an image sensor. The first lens group includes a first air lens having negative refractive power and a convex surface facing the object side and a second air lens having negative refractive power and two convex surfaces. The second lens group includes a lens closest to the image side of the optical axis that has positive refractive power and a convex surface facing the image side. The closest image-side lens includes an aspherical surface. The optical lens assembly has a maximum viewing angle of 130 degrees or more.

21 Claims, 20 Drawing Sheets

(56) References Cited

U.S. PATENT DOCUMENTS

| | | | |
|---|---|---|---|
| 2002/0176176 A1* | 11/2002 | Shinohara | G02B 13/04 359/676 |
| 2002/0176177 A1* | 11/2002 | Takatsuki | G02B 15/177 359/691 |
| 2003/0179466 A1* | 9/2003 | Takatsuki | G02B 15/177 359/691 |
| 2006/0212072 A1 | 9/2006 | Cuevas et al. | |
| 2007/0229977 A1* | 10/2007 | Sawamoto | G02B 15/177 359/692 |
| 2008/0002263 A1* | 1/2008 | Yamamoto | G02B 15/177 359/692 |
| 2008/0212203 A1* | 9/2008 | Taguchi | G02B 15/177 359/691 |
| 2009/0323199 A1* | 12/2009 | Tomioka | G02B 15/177 359/689 |
| 2012/0013996 A1* | 1/2012 | Okumura | G02B 13/06 359/691 |
| 2012/0147480 A1* | 6/2012 | Fujisaki | G02B 15/177 359/691 |
| 2012/0307379 A1* | 12/2012 | Kato | G02B 15/177 359/691 |
| 2013/0057972 A1 | 3/2013 | Lee | |
| 2013/0114150 A1 | 5/2013 | Kwon | |
| 2013/0194488 A1* | 8/2013 | Kubota | G02B 9/64 348/360 |
| 2013/0265648 A1* | 10/2013 | Saori | G02B 15/22 359/691 |
| 2013/0329121 A1* | 12/2013 | Ono | G02B 15/177 348/345 |
| 2013/0329305 A1* | 12/2013 | Kunugise | G02B 15/177 359/691 |
| 2014/0177070 A1* | 6/2014 | Saito | G02B 15/177 359/691 |
| 2015/0338621 A1* | 11/2015 | Jang | G02B 15/177 359/691 |
| 2017/0227745 A1* | 8/2017 | Noda | G02B 13/06 |
| 2017/0227746 A1* | 8/2017 | Noda | G02B 13/06 |

* cited by examiner

OPTICAL LENS ASSEMBLY AND ELECTRONIC APPARATUS INCLUDING THE SAME

CLAIM OF PRIORITY

This application claims the benefit of Korean Patent Application No. 10-2016-0019966, filed on Feb. 19, 2016, in the Korean Intellectual Property Office, the disclosure of which is incorporated herein in its entirety by reference.

BACKGROUND

1. Field

The present disclosure generally relates to optical lens assemblies and electronic apparatuses such disclosed lens assemblies, and more particularly, to optical lens assemblies having a wide maximum viewing angle.

2. Description of the Related Art

Camera technology has greatly advanced in recent years so that cameras are no longer stand-alone cameras, but rather components of a variety of ubiquitous electronic devices (apparatuses) such as mobile devices, home appliances, or other user devices. These devices may provide various image-capture services using various sensor modules. For example, these devices may provide multimedia services such as photo services or video services. As the use of electronic apparatuses has increased, the use of cameras in these electronic apparatuses has also increased. Accordingly, in response to user demand, camera performances and/or resolutions in these electronic apparatuses have steadily improved. In light of these improvements, cameras of these electronic apparatuses are used to take various types of pictures such as landscape pictures, portrait pictures, or self-shot pictures or "selfies." Using the electronic apparatuses' telephony or data connection services, multimedia files such as pictures or videos may be shared on social networks or other media.

With the development of semiconductor and display technologies, camera lenses of mobile devices such as smartphones have been improved from low resolution to high resolution, from small sensor format to larger sensor format (e.g., ⅛" to ½" sensors), and from telephoto lenses to super-wide-angle lenses.

In the case of a super-wide-angle lens or a fish-eye lens in the prior art, degradation of image quality in the periphery of an image is large when a maximum viewing angle is 130 degrees or more. Also, in the prior art, it is often difficult to perform aberration control when a large aperture and a maximum viewing angle of 130 degrees or more are implemented in the super-wide-angle lens.

SUMMARY

As the usage of imaging devices such as cameras in portable apparatuses increases, there is an increasing demand for miniaturization of the imaging device or camera. However, in the case of prior art super-wide-angle lens or fish-eye lens, it is often difficult to perform aberration control in the super-wide angles lenses while maintaining large apertures in the lenses and also keeping the lenses miniaturized.

One or more embodiments of super-wide-angle optical lens assemblies for use in electronic apparatuses (e.g., portable terminals) are disclosed. Additional aspects of the disclosed lens assemblies will be set forth in part in the description which follows and, in part, will be apparent from the description, or may be learned by practice of the disclosed embodiments.

According to an aspect of an embodiment, an optical lens assembly includes a first lens group having positive refractive power, an iris diaphragm, and a second lens group having positive refractive power, which are arranged from an object side to an image side of an optical axis, the object side facing an object for image capture and the image side facing an imaging surface of an image sensor, wherein the first lens group includes a first air lens having negative refractive power and a convex surface facing the object side and a second air lens having negative refractive power and both convex surfaces, the second lens group includes a lens closest to the image side of the optical axis that has a positive refractive power and a convex surface facing the image side, the lens closest to the image side of the optical axis includes an aspherical surface, and the optical lens assembly has a maximum viewing angle of 130 degrees or more and satisfies the following conditions:

$$-80 < F\text{air}1/F < -5$$

$$-3.7 < F\text{air}2/F < -1$$

$$1.8 < Fp2/F < 3.7$$

where "F" denotes a focal length of the optical lens assembly, "Fair1" denotes a focal length of the first air lens, "Fair2" denotes a focal length of the second air lens, and "Fp2" denotes a focal length of the lens in the second lens group closest to the imaging surface.

The optical lens assembly may satisfy the following conditions:

$$-1.0 < (R1\text{air}1 - R2\text{air}1)/(R1\text{air}1 + R2\text{air}1) < -0.1$$

$$-8.0 < (R1\text{air}2 - R2\text{air}2)/(R1\text{air}2 + R2\text{air}2) < -2.0$$

where "R1air1" denotes a curvature radius of a surface of the first air lens facing the object, "R2air1" denotes a curvature radius of a surface of the first air lens facing the imaging surface, "R1air2" denotes a curvature radius of a surface of the second air lens facing the object, and "R2air2" denotes a curvature radius of a surface of the second air lens facing the imaging surface.

The optical lens assembly may satisfy the following condition:

$$2.5 < F2/F < 5.0$$

where "F" denotes a focal length of the optical lens assembly, and "F2" denotes a focal length of the second lens group.

The first lens group may further include a first lens having negative refractive power disposed along the optical axis adjacent to a surface of the second air lens facing the imaging surface; and a second lens having positive refractive power disposed along the optical axis adjacent to the first lens, wherein the second lens is an aspherical lens.

The optical lens assembly may satisfy the following conditions:

$$Np1 > 1.75$$

$$1.0 < Fp1/F < 9$$

$$Vn1 > 60$$

where "Np1" denotes a refractive index of the second lens having positive refractive power in the first lens group, "Fp1" denotes a focal length of the second lens having positive refractive power in the first lens group, and "Vn1" denotes an Abbe number of the lens having negative refractive power in the first lens group.

The first lens group may further include a double-sided aspherical lens having negative refractive power, the double-sided aspherical lens satisfies the following conditions:

$$-0.4 < (R1asp1 - R1bestfit1)/(R1asp1) + (R2asp1 - R2bestfit1)/(R2asp1) < 0.8$$

$$0.8 < EffD2asp1/2Y < 1.3$$

where "R1asp1" denotes a curvature radius of a surface of the double-sided aspherical lens facing the object, "R2asp1" denotes a curvature radius of a surface of the double-sided aspherical lens facing the imaging surface, "R1bestfit1" denotes a best-fit curvature radius of the surface of the double-sided aspherical lens facing the object, "R2bestfit1" denotes a best-fit curvature radius of the surface of the double-sided aspherical lens facing the imaging surface, "EffD2asp1" denotes an effective diameter of the surface of the double-sided aspherical lens facing the imaging surface, and "Y" denotes an image height of an image of the object captured by the image sensor.

The second lens group may further include a third lens having positive refractive power disposed on the optical axis between the object and the lens nearest to the imaging surface, wherein a surface of the third lens facing the object is convex; and a fourth lens having negative refractive power disposed on the optical axis between the third lens and the lens nearest to the imaging surface.

For example, the third lens and the fourth lens are joined together.

The second lens group may further include at least one lens having positive refractive power and at least one lens having negative refractive power and satisfies the following conditions:

$$N2p - N2n < -0.1$$

$$30 < V2p - V2n$$

where "N2p" denotes a refractive index of a lens having positive refractive power and a smallest refractive power in the second lens group, "N2n" denotes a refractive index of a lens having negative refractive power and a greatest refractive power in the second lens group, "V2p" denotes an Abbe number of the lens having positive refractive power and the smallest refractive power in the second lens group, and "V2n" denotes an Abbe number of the lens having negative refractive power and the greatest refractive power in the second lens group.

The second lens group may further include a triple junction lens disposed on the optical axis between the object and the lens nearest to the imaging surface, and wherein a middle lens of the triple junction lens comprises a resin.

The optical lens assembly may satisfy the following conditions:

$$0.8 < (dY/d\theta)(\theta)/(dY/d\theta)(\theta) < 1.2$$

$$0 \leq \theta \leq (FOV/2)$$

where "FOV" denotes a maximum viewing angle of the optical lens assembly, and "dY/dθ(θ)" denotes a first-order differential function for θ with respect to a function Y=f(θ), wherein the function Y=f(θ) is a mapping function between a viewing angle θ and an image height Y of an image of the object captured by the image sensor.

The optical lens assembly may satisfy the following conditions:

$$|RayAngle1/(FOV/2)| < 0.4$$

$$|RayAngle2/(FOV/2)| < 0.13$$

where "FOV" denotes a maximum viewing angle of the optical lens assembly, "RayAngle1" denotes an angle at which a chief ray among rays formed at a maximum image height passes through the iris diaphragm, and "RayAngle2" denotes an angle at which the chief ray is incident on the imaging surface.

The first lens group may further include an air gap that forms a third air lens having positive refractive power and a convex surface facing the object.

The first air lens may be an air gap between two meniscus lenses each having a convex surface facing the object.

The second air lens may be an air gap between a biconcave lens and a meniscus lens, the meniscus lens having a convex surface facing the object.

The second air lens may be an air gap between a first meniscus lens and a second meniscus lens, the first meniscus lens having a convex surface facing the object, and the second meniscus lens having a convex surface facing the imaging surface.

According to an aspect of another embodiment, an optical lens assembly includes a first lens group having negative refractive power, an iris diaphragm, and a second lens group having positive refractive power, which are arranged from an object side to an image side of an optical axis, the object side facing an object for image capture and the image side facing an imaging surface of an image sensor, wherein the first lens group includes a first air lens having negative refractive power and a convex surface facing the object side, a second air lens having negative refractive power and both convex surfaces, a lens having negative refractive power on an image side of the second air lens, and an aspherical lens having positive refractive power, the second lens group includes a lens closest to the image side of the optical axis that has positive refractive power and a convex surface facing the image side, the lens closest to the image side includes an aspherical surface, and the optical lens assembly has a maximum viewing angle of 130 degrees or more and satisfies the following conditions:

$$-80 < Fair1/F < -5$$

$$-3.7 < Fair2/F < -1$$

$$1.0 < Fp1/F < 9.0$$

$$Vn1 > 60$$

where "F" denotes a focal length of the optical lens assembly, "Fair1" denotes a focal length of the first air lens, "Fair2" denotes a focal length of the second air lens, "Fp1" denotes a focal length of the aspherical lens of the first lens group, and "Vn1" denotes an Abbe number of the lens having a negative refractive power in the first lens group.

According to an aspect of another embodiment, an electronic apparatus includes: at least one optical lens assembly; and an image sensor configured to receive a light formed by the at least one optical lens assembly, wherein the at least one optical lens assembly includes a first lens group having positive refractive power, an iris diaphragm, and a second lens group having negative refractive power, which are arranged from an object side to an image side of an optical axis, the object side facing an object for image capture and the image side facing an imaging surface of an image sensor, the first lens group includes a first air lens having negative refractive power and a convex surface facing the object side and a second air lens having negative refractive power and both convex surfaces, the second lens group includes a lens closest to the image side of the optical axis that has positive refractive power and a convex surface facing the image side, the lens closest to the image side includes an aspherical surface, and the optical lens assembly has a maximum viewing angle of 130 degrees or more and satisfies the following conditions:

$-80 < Fair1/F < -5$ $-3.7 < Fair2/F < -1$ $1.8 < Fp2/F < 3.7$ where "F" denotes a focal length of the optical lens assembly, "Fair1" denotes a focal length of the first air lens, "Fair2" denotes a focal length of the second air lens, and "Fp2" denotes a focal length of the lens in the second lens group closest to the image side.

The electronic apparatus may include no more than two optical lens assemblies to capture an omnidirectional spherical image.

In another embodiment, the optical lens assembly may be provided in plurality to enable omnidirectional photographing.

In another embodiment, the at least one optical lens assembly may include a first optical lens assembly and a second optical lens assembly, and the first optical lens assembly and the second optical lens assembly may be arranged on a straight line.

In yet another embodiment, the image sensor may include an infrared sensitive pixel.

BRIEF DESCRIPTION OF THE DRAWINGS

These and/or other aspects of the disclosed embodiments will become apparent and more readily appreciated from the following description of various embodiments, taken in conjunction with the accompanying drawings in which.

DETAILED DESCRIPTION

Figure 1:
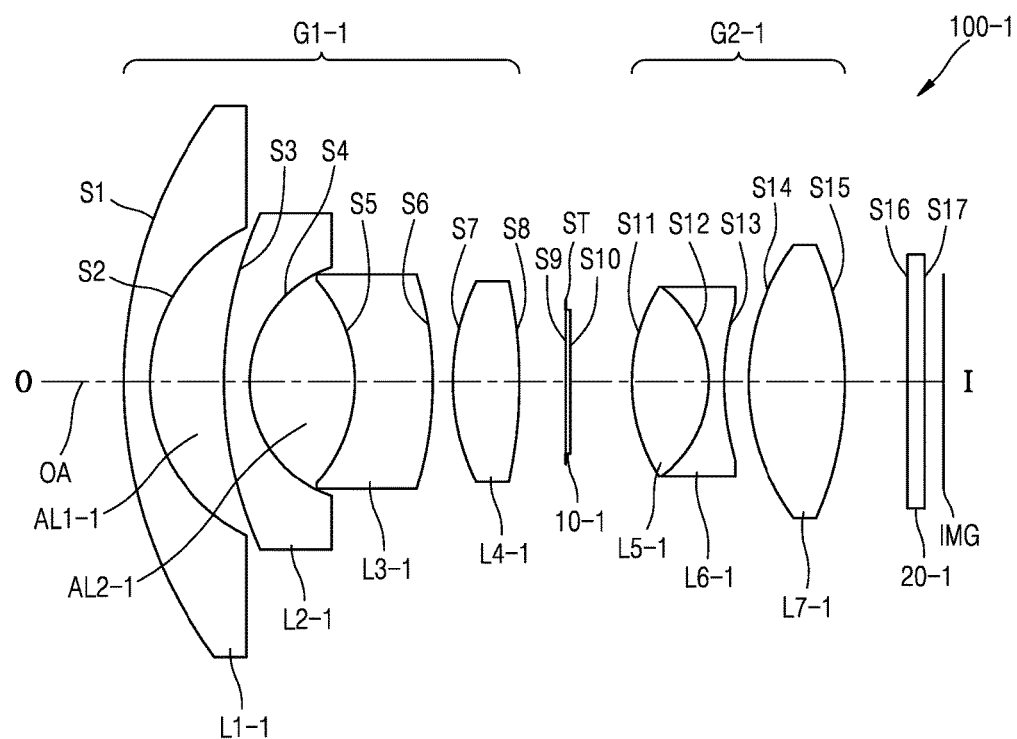
FIG. 1 illustrates an optical lens assembly according to a first embodiment.

Reference will now be made in detail to embodiments, examples of which are illustrated in the accompanying drawings, wherein like reference numerals refer to like elements throughout. In this regard, the embodiments in the disclosure may have different forms and the present disclosure should not be construed as being limited to the descriptions set forth herein. Accordingly, the embodiments are merely described below, by referring to the figures, to explain aspects of the disclosure. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments of the present disclosure will be described with reference to the accompanying drawings. However, it should be understood that the present disclosure is not limited to these particular embodiments but also includes various modifications, equivalents, and/or alternatives thereof. Throughout the specification and drawings, like reference numerals may be used to denote like elements or components.

When used herein, terms such as "comprise," "include," and "have" specify the presence of stated features (e.g., values, functions, operations, parts, elements, and components) but do not preclude the presence or addition of one or more other features.

As used herein, expressions such as "A or B," "at least one of A and/or B," and "one or more of A and/or B" may include any and all combinations of one or more of the associated listed items. For example, "A or B," "at least one of A and B," or "at least one of A or B" may denote all of the cases of (1) including at least one A, (2) including at least one B, and (3) including at least one A and at least one B.

Terms such as "first" and "second" used herein may modify various elements or components regardless of their order and/or importance. These terms may be used only to distinguish one element or component from another element or component, and these elements or components should not be limited by these terms. For example, a first user device and a second user device may refer to different user devices regardless of their order or importance. For example, without departing from the scope of the present disclosure, a first component may be referred to as a second component, and vice versa.

It will be understood that when a component (e.g., a first component) is referred to as being "(operatively or communicatively) coupled to/with" or "connected to/with" another component (e.g., a second component), it may be coupled to/with or connected to/with the other component directly or indirectly through one or more other components (e.g., third components). On the other hand, when a component (e.g., a first component) is referred to as being "directly coupled to/with" or "directly connected to/with" another component (e.g., a second component), no other components (e.g., third components) exist therebetween.

The expression "configured to (or set to)" used herein may be replaced with, for example, "suitable for," "having the capacity to," "designed to," "adapted to," "made to," or "capable of" according to the context. The expression "configured to (or set to)" may not necessarily mean "specifically designed to" in a hardware level. Instead, in some case, the expression "apparatus configured to . . . " may mean that the apparatus is "capable of . . . " along with other devices or parts. For example, "a processor configured to (or set to) perform A, B, and C" may refer to a dedicated processor (e.g., an embedded processor) for performing a corresponding operation, or a general-purpose processor (e.g., a central processing unit (CPU) or an application processor (AP)) capable of performing a corresponding operation by executing one or more software programs stored in a memory device.

The terms used herein are just for the purpose of describing particular embodiments and are not intended to limit the scope of the present disclosure. As used herein, the singular forms "a," "an," and "the" may include the plural forms as well, unless the context clearly indicates otherwise. Unless otherwise defined, all terms (including technical or scientific terms) used herein may have the same meanings as commonly understood by those of ordinary skill in the art of the present disclosure. The terms defined in commonly used dictionaries may be interpreted as having the same meanings as the contextual meanings of the related art and will not be interpreted in an idealized or overly formal sense unless expressly so defined herein. In some cases, even the terms defined herein may not be interpreted to exclude the embodiments of the present disclosure.

An electronic apparatus or electronic device according to various embodiments of the present disclosure may include, for example, at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), a Motion Picture Expert Group (MPEG) audio layer 3 (MP3) player, a mobile medical device, a camera, or a wearable device. According to various embodiments, the wearable device may include at least one of accessory-type devices (e.g., watches, rings, wristlets, anklets, necklaces, spectacles, contact lenses, or head-mounted devices (HMDs)), textile or clothing-integrated devices (e.g., electronic clothing), body-attachable devices (e.g., skin pads or tattoos), or bio-implantable devices (e.g., implantable circuits).

In some embodiments, the electronic apparatus may be a home appliance. The home appliance may include, for example, at least one of a television (TV), a digital video disk (DVD) player, an audio device, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Goggle TV™), a game console (e.g., Xbox™ or PlayStation™), an electronic dictionary, an electronic key, a camcorder, or an electronic picture frame.

In other embodiments, the electronic apparatus may include at least one of any type of medical device (e.g., any type of portable medical meter (such as a blood sugar meter, a heart rate meter, a blood pressure meter, or a body temperature meter), a magnetic resonance angiography (MRA) device, a magnetic resonance imaging (MRI) device, a computerized tomography (CT) device, a tomograph, or an ultrasound machine), a navigation device, a global navigation satellite system (GNSS), an event data recorder (EDR), a flight data recorder (FDR), an automotive infotainment device, an electronic ship equipment (e.g., a ship navigation device or a gyrocompass), an avionic device, a security device, a vehicle head unit, an industrial or home robot, an automatic teller machine (ATM) of a financial institution, a point-of-sale (POS) device of a store, or an Internet-of-Things (IoT) device (e.g., an electric bulb, any type of sensor, an electricity or gas meter, a sprinkler, a fire alarm, a thermostat, a street lamp, a toaster, an exercise equipment, a hot-water tank, a heater, or a boiler).

According to some embodiments, the electronic apparatus may include at least one of a part of furniture or building/structure, an electronic board, an electronic signature receiving device, a projector, or any type of meter (e.g., a water meter, an electricity meter, a gas meter, or a radio wave meter). In various embodiments, the electronic apparatus may be any one or any combination of the above-described various devices. The electronic apparatus according to some embodiments may be a flexible electronic apparatus. Also, the electronic apparatus according to the embodiments of the present disclosure is not limited to the above-described devices and may include new electronic apparatuses resulting from technology development.

Hereinafter, electronic apparatuses according to various embodiments will be described with reference to the accompanying drawings. As used herein, the term "user" may refer to a person using the electronic apparatus, or an apparatus (e.g., an artificial intelligence (AI) electronic apparatus) using the electronic apparatus.

Hereinafter, optical lens assemblies and electronic apparatuses including the disclosed lens assemblies according to various embodiments will be described in detail with reference to the accompanying drawings.

FIG. 1 illustrates an optical lens assembly 100-1 according to a first embodiment.

The optical lens assembly 100-1 according to the first embodiment may include a first lens group G1-1 and a second lens group G2-1 arranged on an optical axis OA from an object side O, that is, a side facing an object for image capture, to an image side I, that is, a side facing an imaging surface of an image sensor. An iris diaphragm ST may be arranged between the first lens group G1-1 and the second lens group G2-1. The first lens group G1-1 may collectively have positive refractive power. The second lens group G2-1 may collectively have positive refractive power.

Hereinafter, for describing the configuration of lens of each embodiment, an image side may refer to the side facing the image plane IMG where an image is formed on the image sensor, and an object side may refer to the side facing the object whose image is to be captured. Also, for example, an object side surface of a lens may refer to the surface of the lens facing the object on the optical axis OA (i.e., the left side surface in the drawings), and an image side surface thereof may refer to the surface of the lens facing the image plane IMG on the optical axis OA (i.e., a right side surface in the drawings). The image plane IMG may be, for example, an imaging device surface or an image sensor surface. An image sensor may include, for example, a sensor such as a complementary metal oxide semiconductor (CMOS) or a charge-coupled device (CCD) sensor. The image sensor is not limited thereto and may be, for example, any device that may convert an detected image of an object into an electrical image signal.

According to the first embodiment, the first lens group G1-1 may include a plurality of lenses arranged from the object side O to the image side I and may include a plurality of air lenses between the plurality of lenses in the first lens group G1-1. The air lens may be formed by an air gap between adjacent lenses and may refer to the space between adjacent lenses.

According to the first embodiment, the first lens group G1-1 may include a first lens L1-1, a second lens L2-1, a third lens L3-1, and a fourth lens L4-1 that are arranged from the object side O to the image side I. A first air lens AL1-1 may be formed between the first lens L1-1 and the second lens L2-1, and a second air lens AL2-1 may be formed between the second lens L2-1 and the third lens L3-1.

The first air lens AL1-1 is an air gap formed by the concave side S2 of lens L1-1 and the convex side S3 of the lens L2-1. However, from the perspective of the first air lens, it may be said that the first air lens AL1-1 has a corresponding convex side S2 and concave side S3. Accordingly, the first air lens AL1-1 may be said to have negative refractive power. Likewise, the second air lens AL2-1 is an air gap formed by the concave side S4 of the lens L2-1 and the concave side S5 of the lens L3-1. Conversely from the perspective of the second air lens AL2-1, it may be said to be bi-convex. But while ordinary bi-convex lenses have positive refractive powers, in the convention of air lenses the opposite is true. Because the air lens AL2-1 is made up of the concave side S4 of the lens L2-1 and the concave side S5 of the lens L3-1, it has negative refractive power.

The first lens L1-1 may have negative refractive power. The first lens L1-1 may have, for example, a convex object side surface S1. The first lens L1-1 may be, for example, a meniscus lens with a convex side towards the object side O. The second lens L2-1 may have negative refractive power. The second lens L2-1 may have, for example, a convex object side surface S3. The second lens L2-1 may be, for example, a meniscus lens with a convex side towards the object side O. The third lens L3-1 may have negative refractive power. The third lens L3-1 may have, for example, a convex image side surface S6. The third lens L3-1 may be, for example, a meniscus lens with a convex side towards the image side I. At least one of the first lens L1-1, the second lens L2-1, and the third lens L3-1 may be an aspherical lens or a double-sided aspherical lens. For example, the second lens L2-1 may be a double-sided aspherical lens.

The fourth lens L4-1 having a positive refractive power may be provided on the image side I of the second air lens AL2-1. The fourth lens L4-1 may be an aspherical lens.

The second lens group G2-1 may include, for example, a fifth lens L5-1 having positive refractive power, a sixth lens L6-1 having negative refractive power, and a seventh lens L7-1 having positive refractive power. The fifth lens L5-1 and the sixth lens L6-1 may be joined together. The seventh lens L7-1 is located closest to the image plane or imaging surface IMG in the second lens group G2-1 and may have an aspherical surface and a convex surface facing the image side I.

Figure 2:
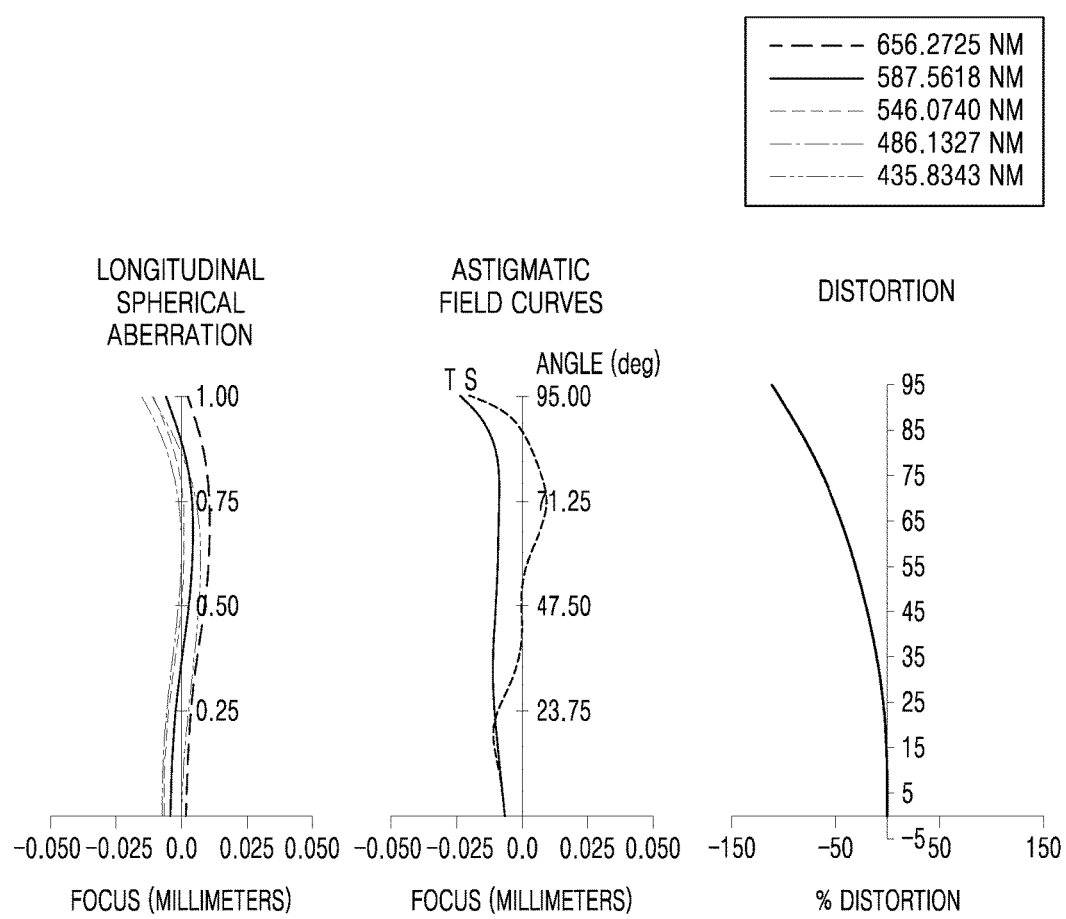
FIG. 2 is an aberration diagram of an optical lens assembly according to the first embodiment.

According to one embodiment, the iris diaphragm ST may be provided between the first lens group G1-1 and the second lens group G2-1. The iris diaphragm ST may be configured to adjust a diameter of a beam entering the lens assembly and may include, for example, an aperture diaphragm, a variable aperture, and a mask-type stop. Also, an optical filter 10-1 may be further provided between the first lens group G1-1 and the second lens group G2-1. According to one embodiments, at least one optical device 20-1 may be provided between the seventh lens L7-1 and the image plane IMG. The optical device 20-1 may be, for example, at least one of a low-pass filter, an infrared (IR)-cut filter, and a cover glass. For example, when an IR-cut filter is provided as the optical device 20-1, visible rays may be transmitted and IR rays may be diverted so that the IR rays are not transmitted to the image plane IMG. However, the disclosed optical lens assembly may or may not include such an optical device. FIG. 2 shows the aberration characteristics of the lens assembly shown in FIG. 1.

Figure 3:
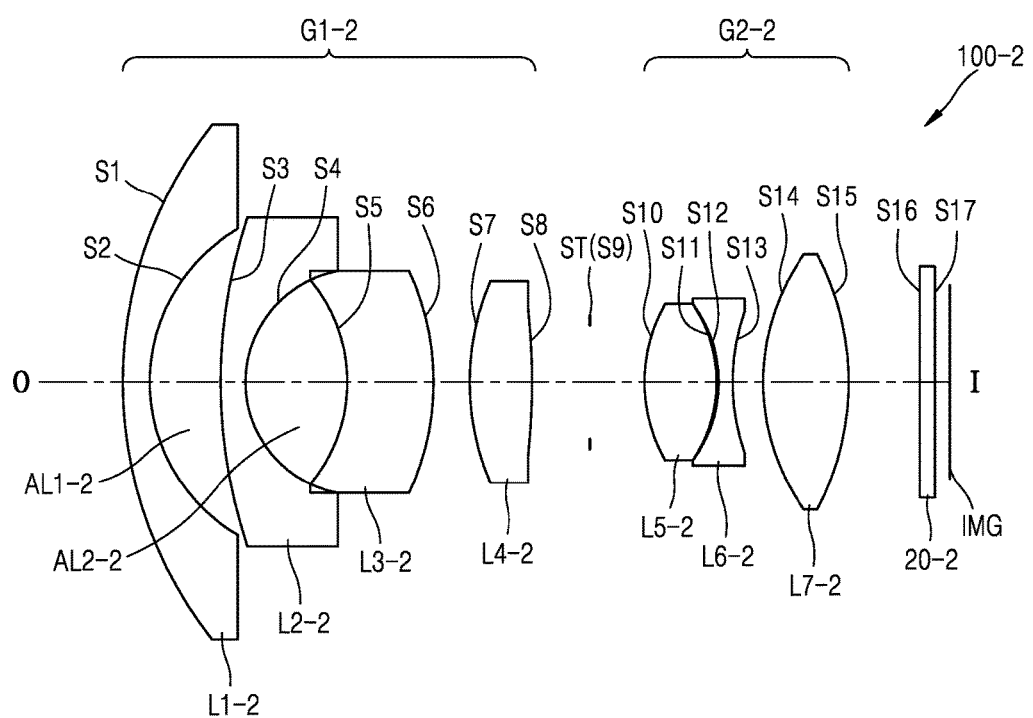
FIG. 3 illustrates an optical lens assembly according to a second embodiment.

FIG. 3 illustrates an optical lens assembly 100-2 according to a second embodiment.

According to the second embodiment, the optical lens assembly 100-2 may include a first lens group G1-2 and a second lens group G2-2 arranged on the optical axis OA from an object side O to an image side I. An iris diaphragm ST may be arranged between the first lens group G1-2 and the second lens group G2-2. The first lens group G1-2 may collectively have positive refractive power. The second lens group G2-2 may collectively have positive refractive power.

According to the second embodiment, the first lens group G1-2 may include a first lens L1-2, a second lens L2-2, a third lens L3-2, and a fourth lens L4-2 that are arranged from the object side O to the image side I. A first air lens AL1-2 may be formed between the first lens L1-2 and the second lens L2-2, and a second air lens AL2-2 may be formed between the second lens L2-2 and the third lens L3-2.

The first air lens AL1-2 may have negative refractive power and may have a convex surface S2 facing the object side O. The second air lens AL2-2 may have negative refractive power and may have two convex surfaces S4 and S5.

The first lens L1-2 may have negative refractive power. The first lens L1-2 may have, for example, a convex object side surface S1. The second lens L2-2 may have negative refractive power. The second lens L2-2 may have, for example, a convex object side surface S3. The third lens L3-2 may have negative refractive power. The third lens L3-2 may have, for example, a convex image side surface S6. The fourth lens L4-2 having positive refractive power may be provided on the image side I of the third lens L3-2. Although not shown in FIG. 3, the fourth lens L4-2 may be an aspherical lens.

The second lens group G2-2 may include, for example, a fifth lens L5-2 having positive refractive power, a sixth lens L6-2 having negative refractive power, and a seventh lens L7-2 having positive refractive power. The seventh lens L7-2 is located closest to the image plane IMG in the second lens group G2-2 and may have at least one aspherical surface and a convex surface facing the image side I. For example, the seventh lens L7-2 may be a biconvex lens, as shown in FIG. 3.

Figure 4:
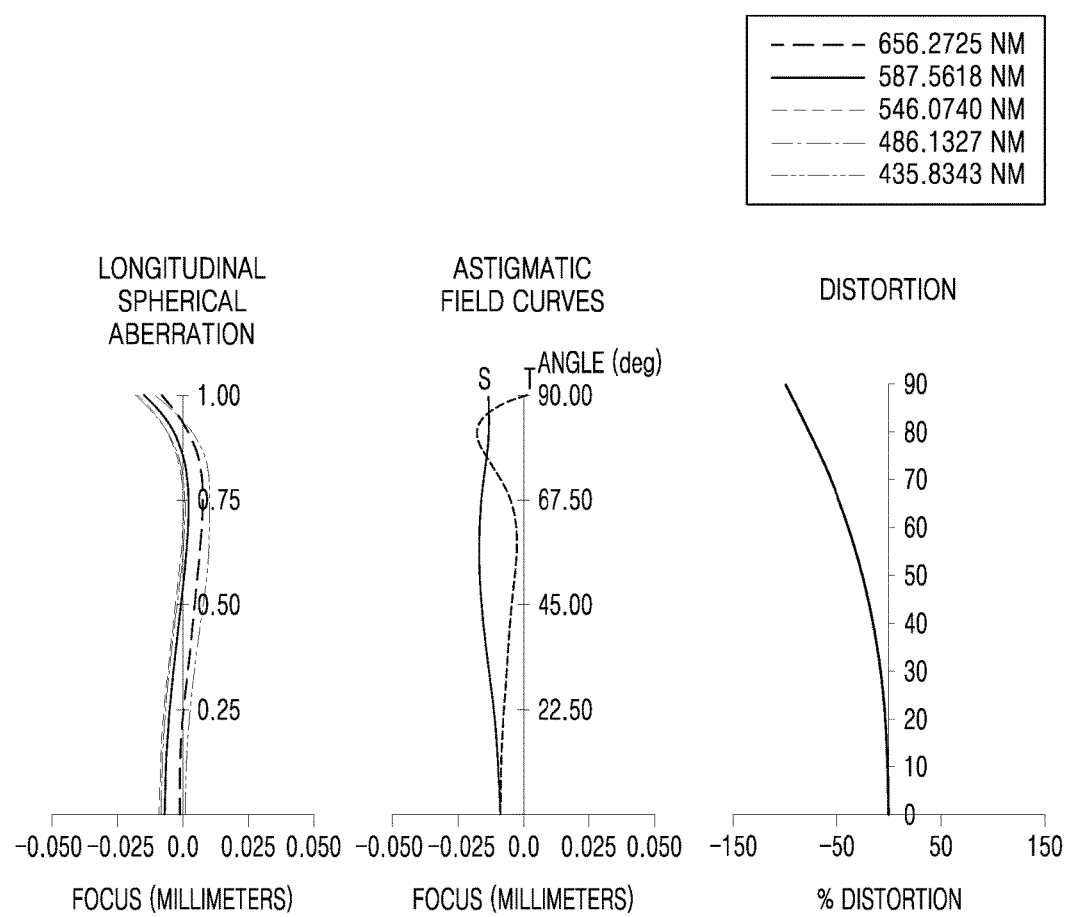
FIG. 4 is an aberration diagram of an optical lens assembly according to the second embodiment.

According to the second embodiment, at least one optical device 20-2 may be provided between the seventh lens L7-2 and the image plane IMG. FIG. 4 shows the aberration characteristics of the lens assembly shown in FIG. 3.

Figure 5:
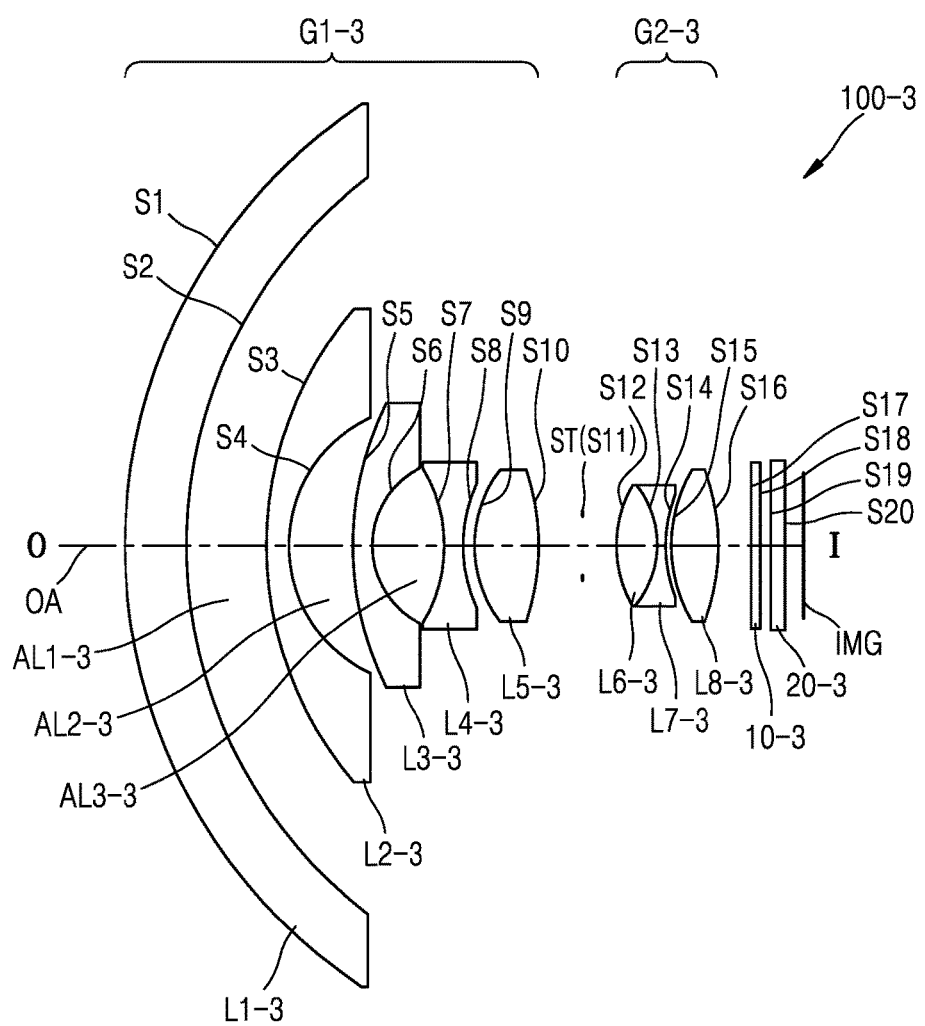
FIG. 5 illustrates an optical lens assembly according to a third embodiment.

FIG. 5 illustrates an optical lens assembly 100-3 according to a third embodiment.

According to the third embodiment, the optical lens assembly 100-3 may include a first lens group G1-3 and a second lens group G2-3 arranged on the optical axis OA from an object side O to an image side I. An iris diaphragm ST may be arranged between the first lens group G1-3 and the second lens group G2-3. The first lens group G1-3 may collectively have positive refractive power. The second lens group G2-3 may collectively have positive refractive power.

According to the third embodiments, the first lens group G1-3 may include a first lens L1-3, a second lens L2-3, a third lens L3-2, a fourth lens L4-3, and a fifth lens L5-3 that are arranged from the object side O to the image side I. A first air lens AL1-3 may be formed between the first lens L1-3 and the second lens L2-3, a second air lens AL2-3 may be formed between the second lens L2-3 and the third lens L3-3, and a third air lens AL3-3 may be formed between the third lens L3-3 and the fourth lens L4-3.

The first air lens AL1-3 may have positive refractive power and may have a convex surface S2 facing the object side O. The second air lens AL2-3 may have negative refractive power and may have a convex surface S4 facing the object side O. The third air lens AL3-3 may have negative refractive power and may have two convex surfaces S6 and S7.

The first lens L1-3 may have negative refractive power. The first lens L1-3 may have, for example, a convex object side surface S1. The second lens L2-3 may have negative refractive power. The second lens L2-3 may have, for example, a convex object side surface S3. The third lens L3-3 may have negative refractive power. The third lens L3-3 may have, for example, a convex object side surface S5. The fourth lens L4-3 may have negative refractive power. The fourth lens L4-3 may be, for example, a biconcave lens. The fifth lens L5-3 may have positive refractive power. The fifth lens L5-3 may include, for example, a convex image side surface S10. The fifth lens L5-3 may be provided on the image side I of the fourth lens L4-3. The fifth lens L5-3 may be an aspherical lens.

The second lens group G2-3 may include, for example, a sixth lens L6-3 having positive refractive power, a seventh lens L7-3 having negative refractive power, and an eighth lens L8-3 having positive refractive power. The eighth lens L8-3 is located closest to the image plane IMG in the second lens group G2-3 and may have at least one aspherical surface and a convex surface facing the image side I. For example, the eighth lens L8-3 may be a biconvex lens, as shown in FIG. 3.

Figure 6:
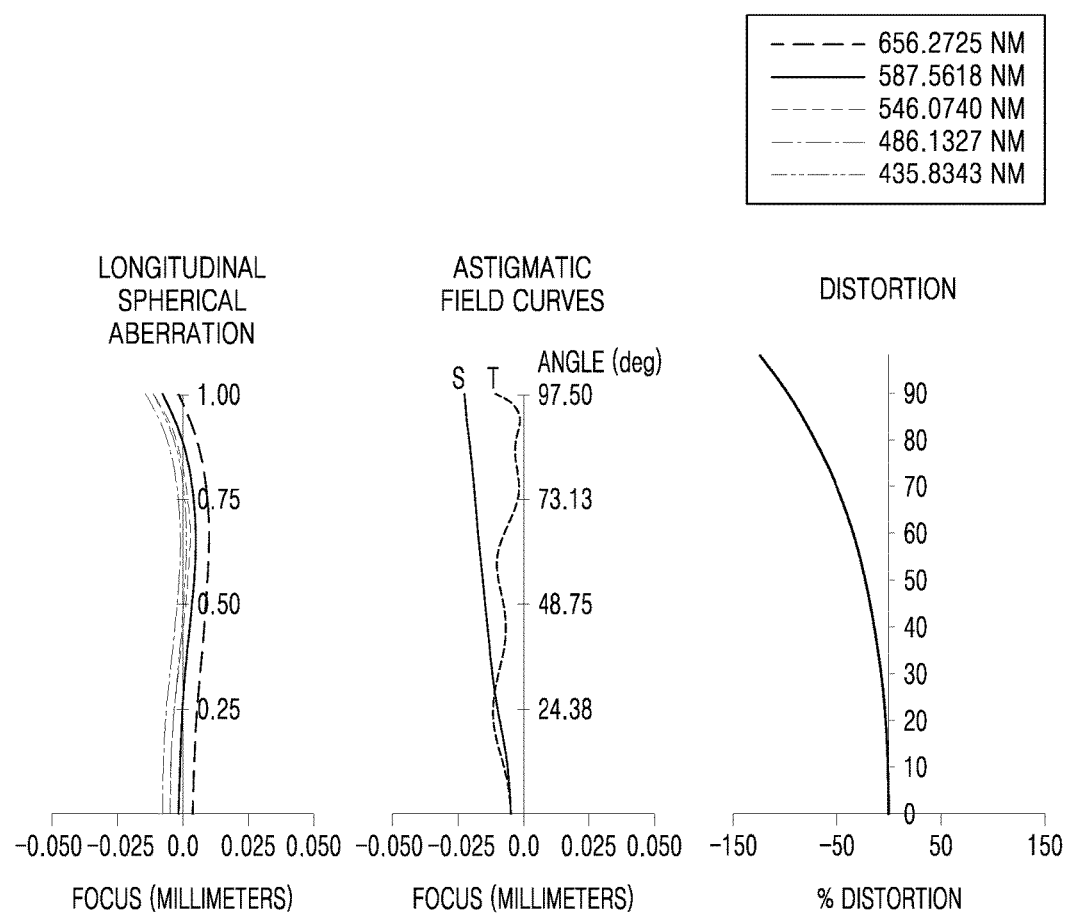
FIG. 6 is an aberration diagram of an optical lens assembly according to the third embodiment.

According to the third embodiment, at least one optical device 10-3 or 20-3 may be provided between the eighth lens L8-3 and the image plane IMG. FIG. 6 shows the aberration characteristics of the lens assembly shown in FIG. 5.

Figure 7:
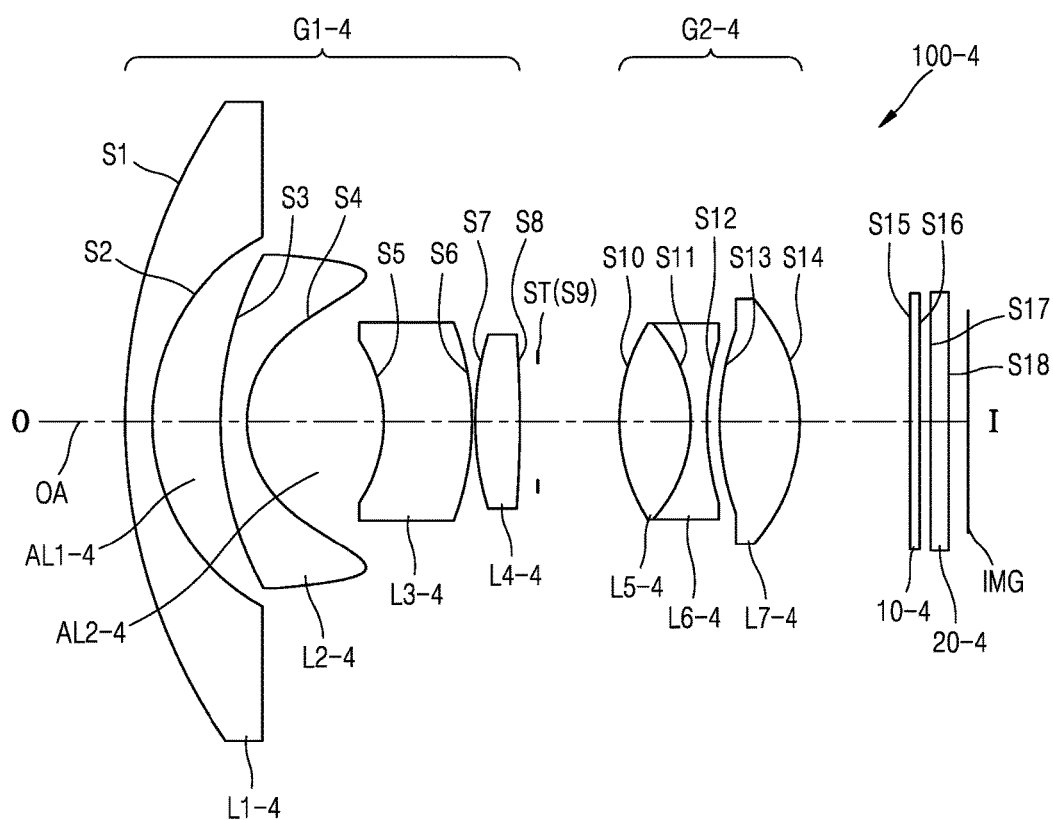
FIG. 7 illustrates an optical lens assembly according to a fourth embodiment.

FIG. 7 illustrates an optical lens assembly 100-4 according to a fourth embodiment.

According to the fourth embodiment, the optical lens assembly 100-4 may include a first lens group G1-4 and a second lens group G2-4 arranged on the optical axis OA from an object side O to an image side I. An iris diaphragm ST may be arranged between the first lens group G1-4 and the second lens group G2-4. The first lens group G1-4 may collectively have positive refractive power. The second lens group G2-4 may collectively have positive refractive power.

According to the fourth embodiment, the first lens group G1-3 may include a first lens L1-4, a second lens L2-4, a third lens L3-4, and a fourth lens L4-4 that are arranged from the object side O to the image side I. A first air lens AL1-4 may be formed between the first lens L1-4 and the second lens L2-4, and a second air lens AL2-4 may be formed between the second lens L2-4 and the third lens L3-4.

The first air lens AL1-4 may have negative refractive power and may have a convex surface S2 facing the object side O. The second air lens AL2-4 may have negative refractive power and may have both convex surfaces S4 and S5.

The first lens L1-4 may have negative refractive power. The first lens L1-4 may have, for example, a convex object side surface S1. The second lens L2-4 may have negative refractive power. The second lens L2-4 may have, for example, a convex object side surface S3. The third lens L3-4 may have negative refractive power. The third lens L3-4 may have, for example, a convex image side surface S6. The fourth lens L4-4 may have positive refractive power. The fourth lens L4-4 may be, for example, a biconvex lens.

The second lens group G2-4 may include, for example, a fifth lens L5-4 having positive refractive power, a sixth lens L6-4 having negative refractive power, and a seventh lens L7-4 having positive refractive power. The seventh lens L7-4 is located closest to the image place IMG in the second lens group G2-4 and may include at least one aspherical surface and a convex surface facing the image side I, as shown in FIG. 7.

Figure 8:
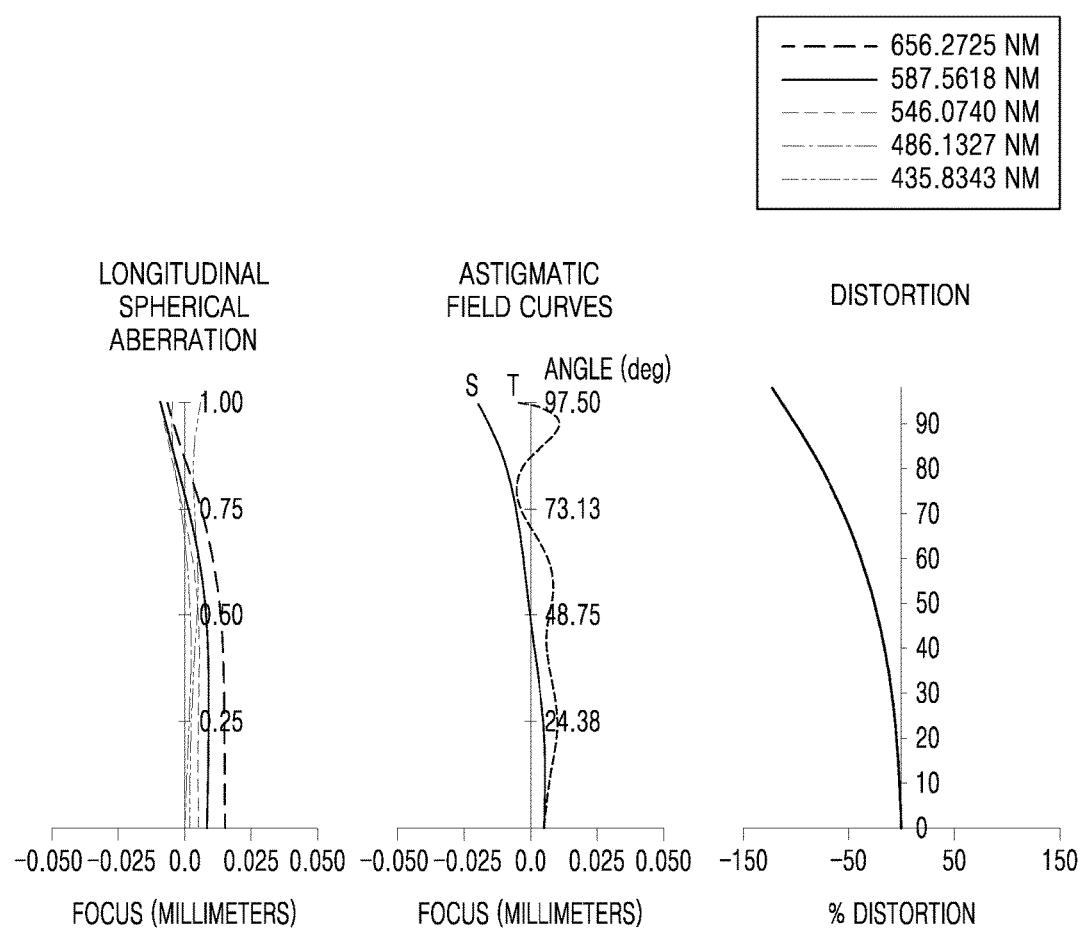
FIG. 8 is an aberration diagram of an optical lens assembly according to the fourth embodiment.

According to the fourth embodiment, at least one optical device 10-4 or 20-4 may be provided between the seventh lens L7-4 and the image plane IMG. FIG. 8 shows the aberration characteristics of the lens assembly shown in FIG. 7.

Figure 9:
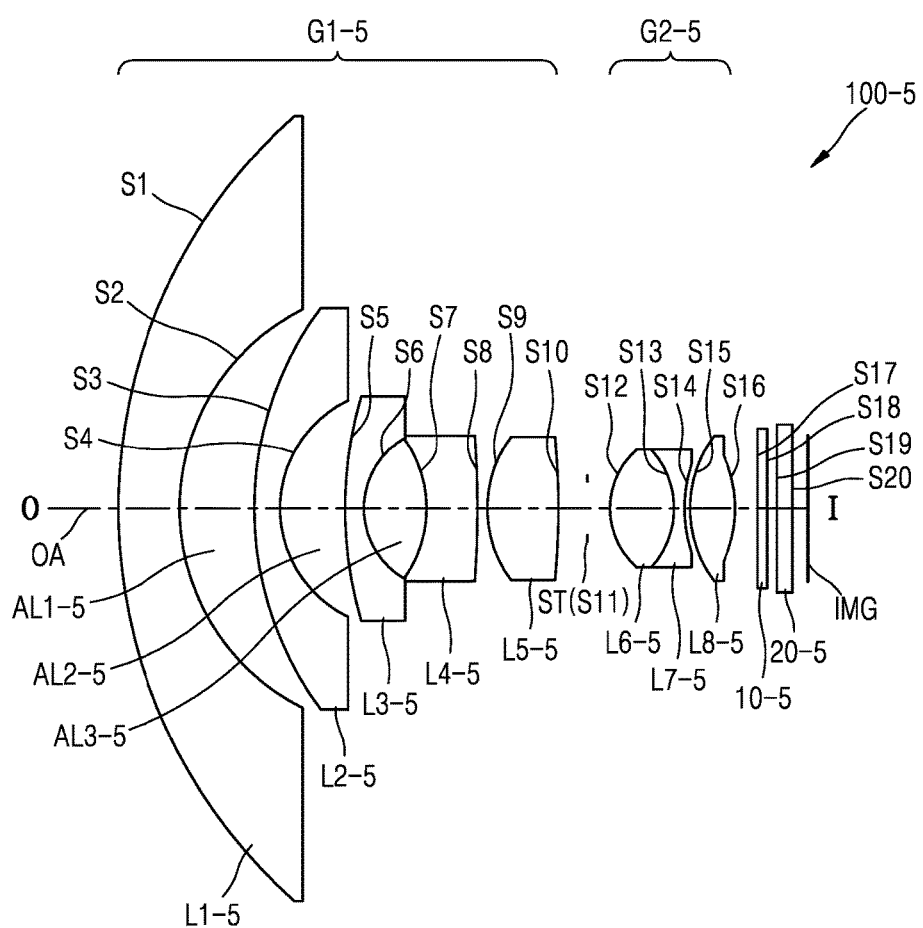
FIG. 9 illustrates an optical lens assembly according to a fifth embodiment.

FIG. 9 illustrates an optical lens assembly 100-5 according to a fifth embodiment.

According to the fifth embodiments, the optical lens assembly 100-5 may include a first lens group G1-5 and a second lens group G2-5 arranged on the optical axis OA from an object side O to an image side I. An iris diaphragm ST may be arranged between the first lens group G1-5 and the second lens group G2-5. The first lens group G1-5 may collectively have positive refractive power. The second lens group G2-5 may collectively have positive refractive power.

According to the fifth embodiment, the first lens group G1-5 may include a first lens L1-5, a second lens L2-5, a third lens L3-5, a fourth lens L4-5, and a fifth lens L5-5 that are arranged from the object side O to the image side I. A first air lens AL1-5 may be formed between the first lens L1-5 and the second lens L2-5, a second air lens AL2-5 may be formed between the second lens L2-5 and the third lens L3-5, and a third air lens AL3-5 may be formed between the third lens L3-5 and the fourth lens L4-5.

The first air lens AL1-5 may have negative refractive power and may have a convex surface S2 facing the object side O. The second air lens AL2-5 may have negative refractive power and may have a convex surface S4 facing the object side O. The third air lens AL3-5 may have negative refractive power and may have both convex surfaces S6 and S7.

The first lens L1-5 may have negative refractive power. The first lens L1-5 may have, for example, a convex object side surface S1. The second lens L2-5 may have negative refractive power. The second lens L2-5 may have, for example, a convex object side surface S3. The third lens L3-5 may have negative refractive power. The third lens L3-5 may have, for example, a convex object side surface S5. The fourth lens L4-5 may have negative refractive power. The fourth lens L4-5 may be, for example, a meniscus lens with a convex surface towards the image side I. The fifth lens L5-5 may have positive refractive power. The fifth lens L5-5 may have, for example, a convex image side surface S10. The fifth lens L5-5 having positive refractive power may be provided on the image side I of the fourth lens L4-5. The fifth lens L5-5 may be an aspherical lens.

The second lens group G2-5 may include, for example, a sixth lens L6-5 having positive refractive power, a seventh lens L7-5 having negative refractive power, and an eighth lens L8-5 having positive refractive power. The sixth lens L6-5 and the seventh lens L7-5 may be joined together. The eighth lens L8-5 is located closest to the image plane IMG in the second lens group G2-5 and may have at least one aspherical surface and a convex surface facing the image side I. For example, the eighth lens L8-5 may be a biconvex lens.

Figure 10:
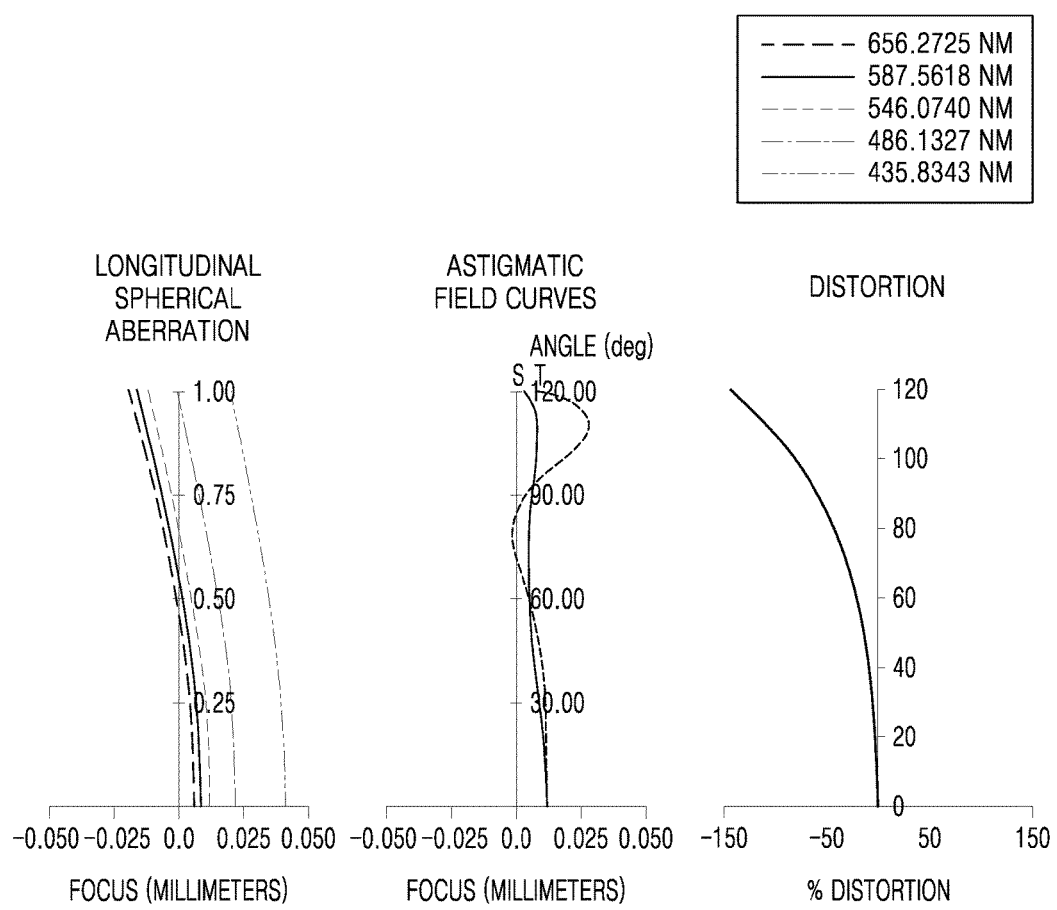
FIG. 10 is an aberration diagram of an optical lens assembly according to the fifth embodiment.

According to the fifth embodiment, at least one optical device 10-5 or 20-5 may be provided between the eighth lens L8-5 and the image plane IMG. FIG. 10 shows the aberration characteristics of the lens assembly shown in FIG. 9.

Figure 11:
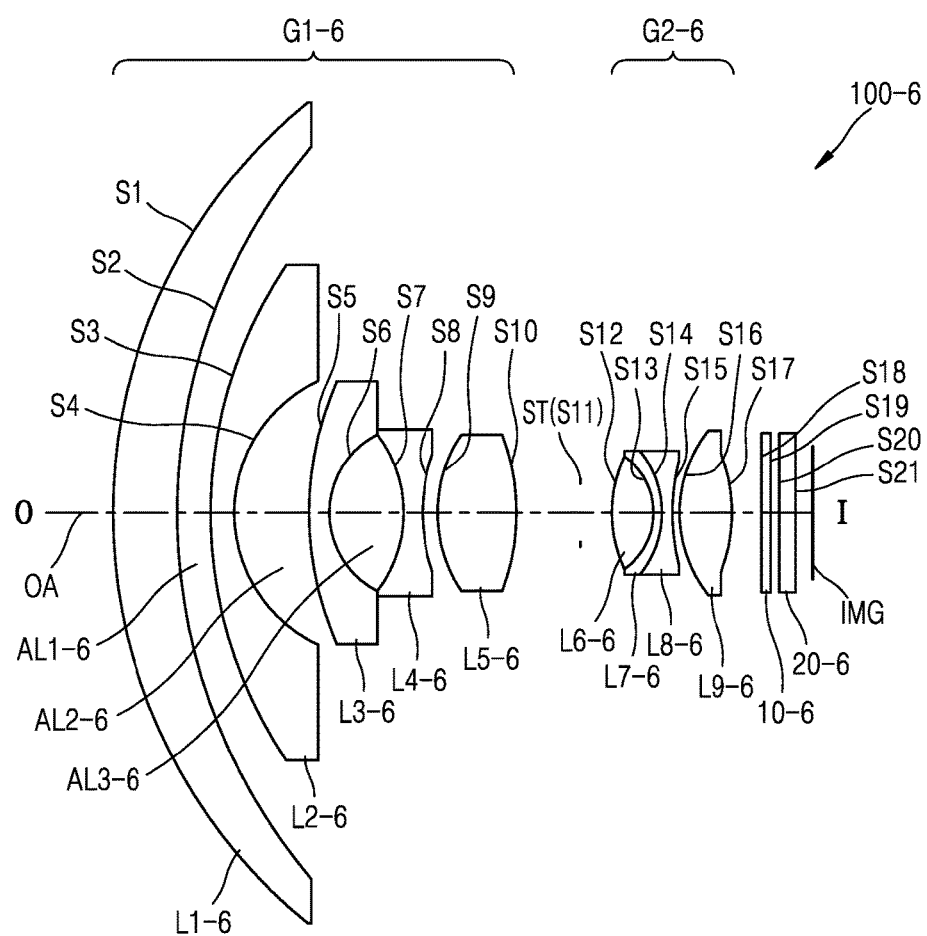
FIG. 11 illustrates an optical lens assembly according to a sixth embodiment.

FIG. 11 illustrates an optical lens assembly 100-6 according to a sixth embodiment.

According to the sixth embodiment, the optical lens assembly 100-6 may include a first lens group G1-6 and a second lens group G2-6 arranged on the optical axis OA from an object side O to an image side I. An iris diaphragm ST may be arranged between the first lens group G1-6 and the second lens group G2-6. The first lens group G1-6 may collectively have positive refractive power. The second lens group G2-6 may collectively have positive refractive power.

According to the sixth embodiment, the first lens group G1-6 may include a first lens L1-6, a second lens L2-6, a third lens L3-6, a fourth lens L4-6, and a fifth lens L5-6 that are arranged from the object side O to the image side I. A first air lens AL1-6 may be formed between the first lens L1-6 and the second lens L2-6, a second air lens AL2-6 may be formed between the second lens L2-6 and the third lens L3-6, and a third air lens AL3-6 may be formed between the third lens L3-6 and the fourth lens L4-6.

The first air lens AL1-6 may have positive refractive power and may have a convex object side surface S2 facing the object side O. The second air lens AL2-6 may have negative refractive power and may have a convex object side surface S4 facing the object side O. The third air lens AL3-6 may have negative refractive power and may have both convex surfaces S6 and S7.

The first lens L1-6 may have negative refractive power. The first lens L1-6 may be, for example, a meniscus lens having a convex surface towards the object side O. The second lens L2-3 may have negative refractive power. The second lens L2-6 may be, for example, a meniscus lens having a convex surface towards the object side O. The third lens L3-3 may have negative refractive power. The third lens L3-3 may be, for example, a meniscus lens having a convex surface towards the object side O. The fourth lens L4-6 may have negative refractive power. The fourth lens L4-6 may be, for example, a biconcave lens. The fifth lens L5-6 may have positive refractive power. The fifth lens L5-6 may have, for example, a convex surface S10 facing the image plane IMG. The fifth lens L5-6 having positive refractive power may be provided on the image side I of the fourth lens L4-6. The fifth lens L5-6 may be an aspherical lens.

The second lens group G2-6 may include, for example, a sixth lens L6-6 having positive refractive power, a seventh lens L7-6, an eighth lens L8-6 having negative refractive power, and a ninth lens L9-6 having positive refractive power. The sixth lens L6-6, the seventh lens L7-6, and the eighth lens L8-6 may constitute a triple junction lens. The seventh lens L7-6 in the triple junction lens may include, for example, a resin material. The ninth lens L9-6 is located closest to the image plane IMG in the second lens group G2-6 and may have at least one aspherical surface and a convex surface facing the image side I. For example, the ninth lens L9-6 may be a biconvex lens.

Figure 12:
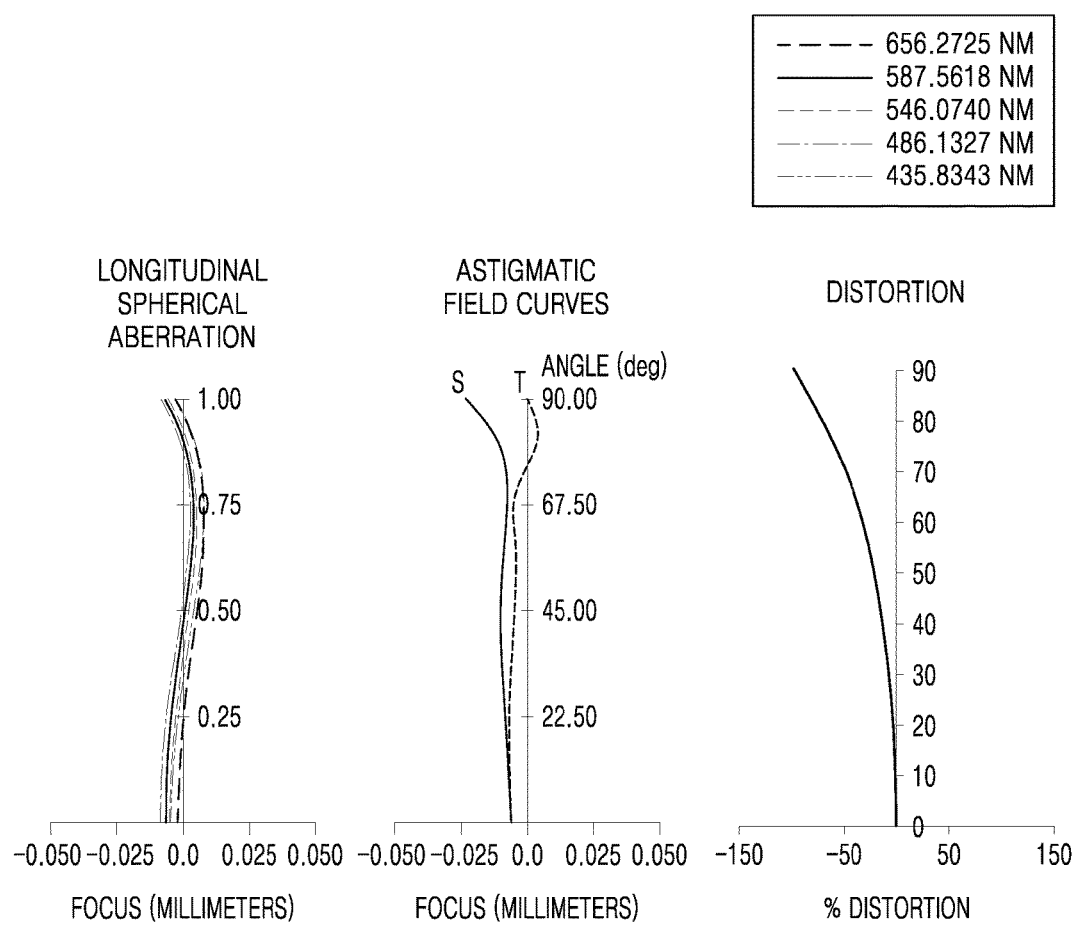
FIG. 12 is an aberration diagram of an optical lens assembly according to the sixth embodiment.

According to the sixth embodiment, at least one optical device 10-6 or 20-6 may be provided between the ninth lens L9-6 and the image plane IMG. FIG. 12 shows the aberration characteristics of the lens assembly shown in FIG. 11.

Figure 13:
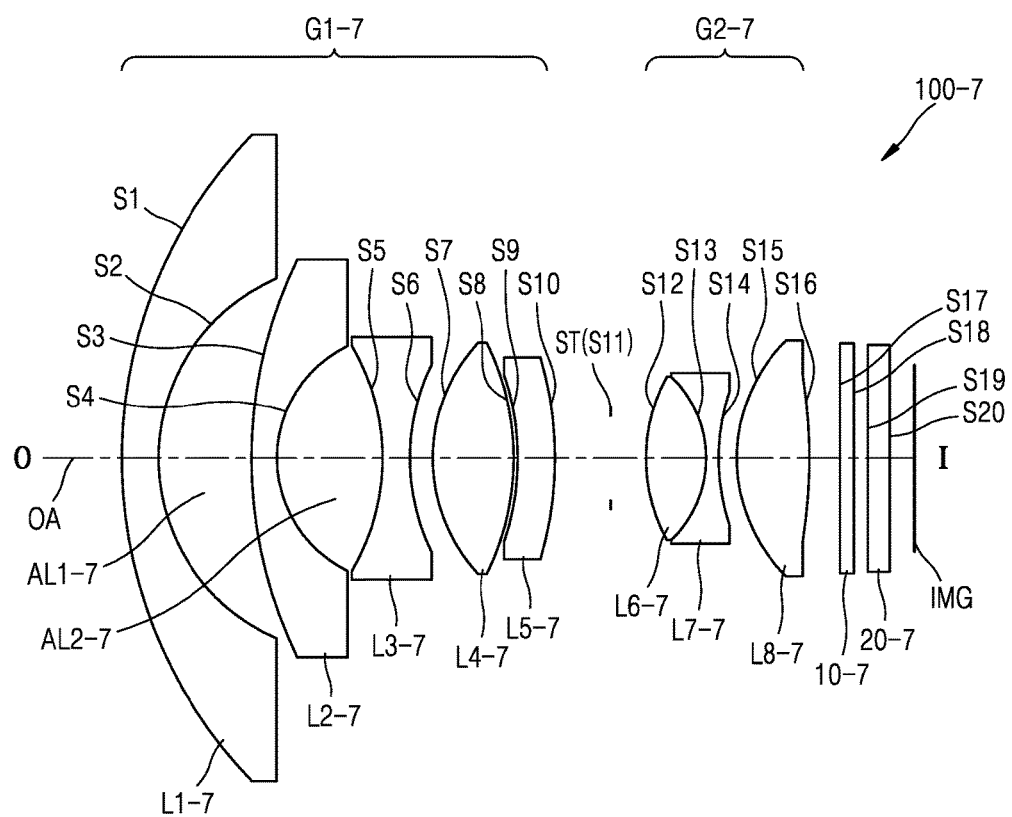
FIG. 13 illustrates an optical lens assembly according to a seventh embodiment.

FIG. 13 illustrates an optical lens assembly 100-7 according to a seventh embodiment.

According to the seventh embodiment, the optical lens assembly 100-7 may include a first lens group G1-7 and a second lens group G2-7 arranged on the optical axis OA from an object side O to an image side I. An iris diaphragm ST may be arranged between the first lens group G1-7 and the second lens group G2-7. The first lens group G1-7 may collectively have positive refractive power. The second lens group G2-7 may collectively have positive refractive power.

According to the seventh embodiment, the first lens group G1-7 may include a first lens L1-7, a second lens L2-7, a third lens L3-7, a fourth lens L4-7, and a fifth lens L5-7 that are arranged from the object side O to the image side I. A first air lens AL1-7 may be formed between the first lens L1-7 and the second lens L2-7, and a second air lens AL2-7 may be formed between the second lens L2-7 and the third lens L3-7.

The first air lens AL1-7 may have negative refractive power and may have a convex surface S2 facing the object side O. The second air lens AL2-7 may have negative refractive power and may have both convex surfaces S4 and S5.

The first lens L1-7 may have negative refractive power. The first lens L1-7 may have, for example, a convex object side surface S1. The second lens L2-7 may have negative refractive power. The second lens L2-7 may have, for example, a convex object side surface S3. The third lens L3-7 may have negative refractive power. The third lens L3-7 may be, for example, a biconvex lens. The fourth lens L4-7 may have positive refractive power. The fourth lens L4-7 may have, for example, a convex image side surface S8. The fourth lens L4-7 having positive refractive power may be provided on the image side I of the third lens L3-7. The fourth lens L4-7 may be, for example, a biconvex lens. The fifth lens L5-7 may have negative refractive power. The fifth lens L5-7 may be an aspherical lens.

The second lens group G2-7 may include, for example, a sixth lens L6-7 having positive refractive power, a seventh lens L7-7 having negative refractive power, and an eighth lens L8-7 having positive refractive power. The eighth lens L8-7 is located closest to the image place IMG in the second lens group G2-7 and may have at least one aspherical surface and a convex surface facing the image side I. For example, the eighth lens L8-7 may be a biconvex lens.

Figure 14:
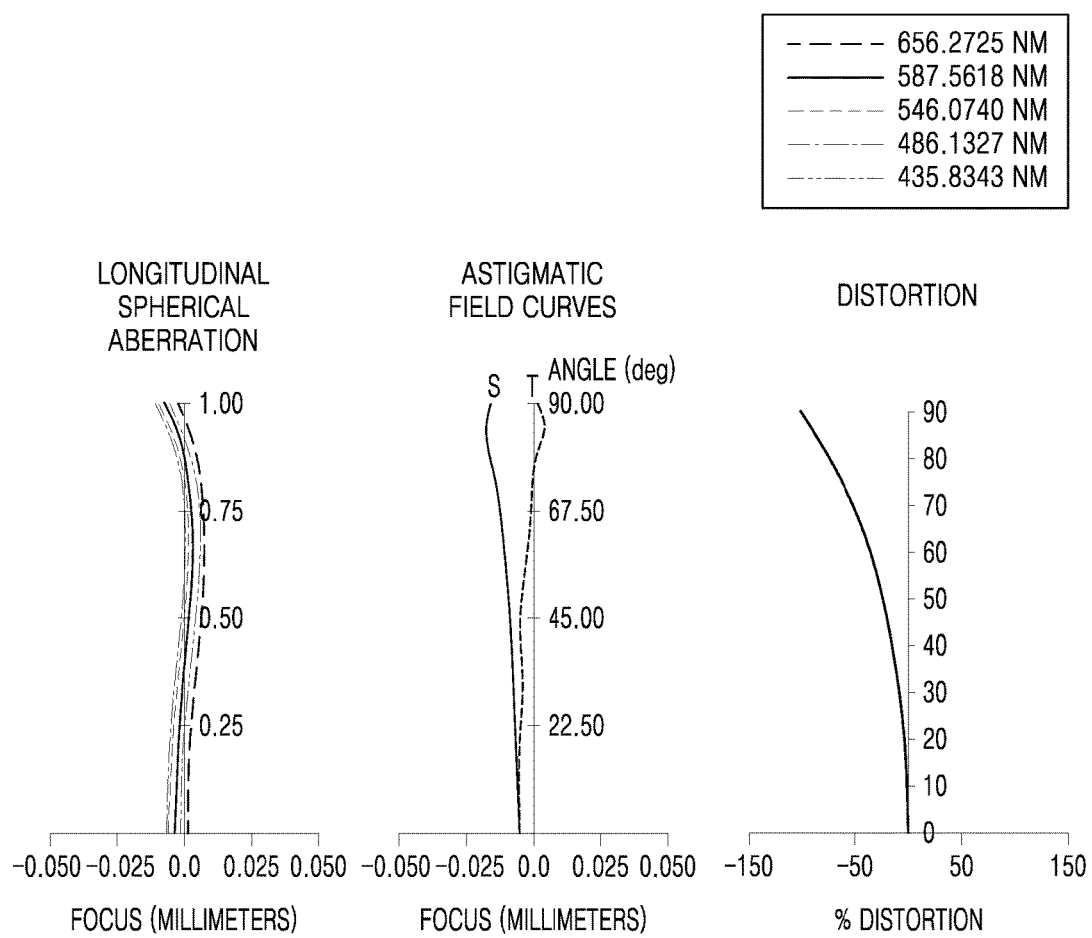
FIG. 14 is an aberration diagram of an optical lens assembly according to the seventh embodiment.

According to the seventh embodiment, at least one optical device 10-7 or 20-7 may be provided between the eighth lens L8-7 and the image plane IMG. FIG. 14 shows the aberration characteristics of the lens assembly shown in FIG. 13.

Figure 15:
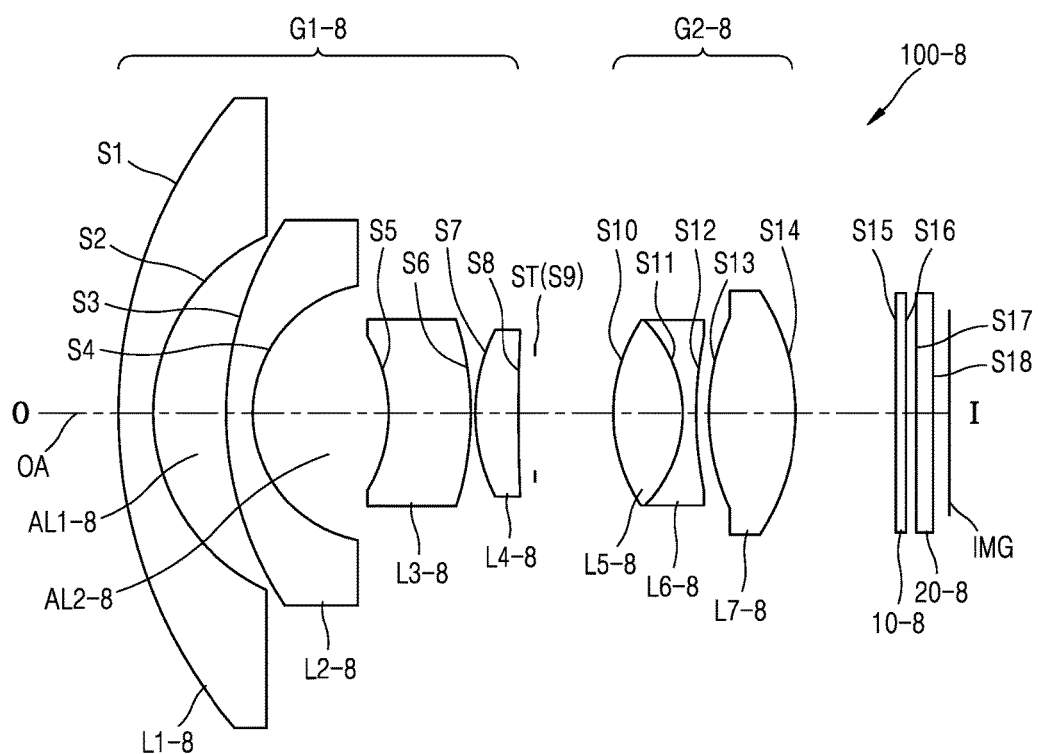
FIG. 15 illustrates an optical lens assembly according to an eighth embodiment.

FIG. 15 illustrates an optical lens assembly 100-8 according to an eighth embodiment.

According to the eighth embodiment, the optical lens assembly 100-8 may include a first lens group G1-8 and a second lens group G2-8 arranged on the optical axis OA from an object side O to an image side I. An iris diaphragm ST may be arranged between the first lens group G1-8 and the second lens group G2-8. The first lens group G1-8 may collectively have negative refractive power. The second lens group G2-8 may collectively have positive refractive power.

According to the eighth embodiment, the first lens group G1-8 may include a first lens L1-8, a second lens L2-8, a third lens L3-8, and a fourth lens L4-8 that are arranged from the object side O to the image side I. A first air lens AL1-8 may be formed between the first lens L1-8 and the second lens L2-8, and a second air lens AL2-8 may be formed between the second lens L2-8 and the third lens L3-8.

The first air lens AL1-8 may have negative refractive power and may have a convex surface S2 facing the object side O. The second air lens AL2-8 may have negative refractive power and may have both convex surfaces S4 and S5.

The first lens L1-8 may have negative refractive power. The first lens L1-8 may have, for example, a convex object side surface S1. The second lens L2-8 may have negative refractive power. The second lens L2-8 may have, for example, a convex object side surface S3. The third lens L3-8 may have negative refractive power. The third lens L3-8 may have, for example, a convex image side surface S6. The fourth lens L4-8 having positive refractive power may be provided on the image side I of the third lens L3-8. The fourth lens L4-8 may be an aspherical lens. The fourth lens L4-8 may have, for example, a concave surface S8 facing the image side I.

The second lens group G2-8 may include, for example, a fifth lens L5-8 having positive refractive power, a sixth lens L6-8 having negative refractive power, and a seventh lens L7-8 having positive refractive power. The seventh lens L7-8 is located closest to the image plane IMG in the second lens group G2-8 and may have at least one aspherical surface and a convex surface facing the image side I. For example, the seventh lens L7-8 may be a biconvex lens.

Figure 16:
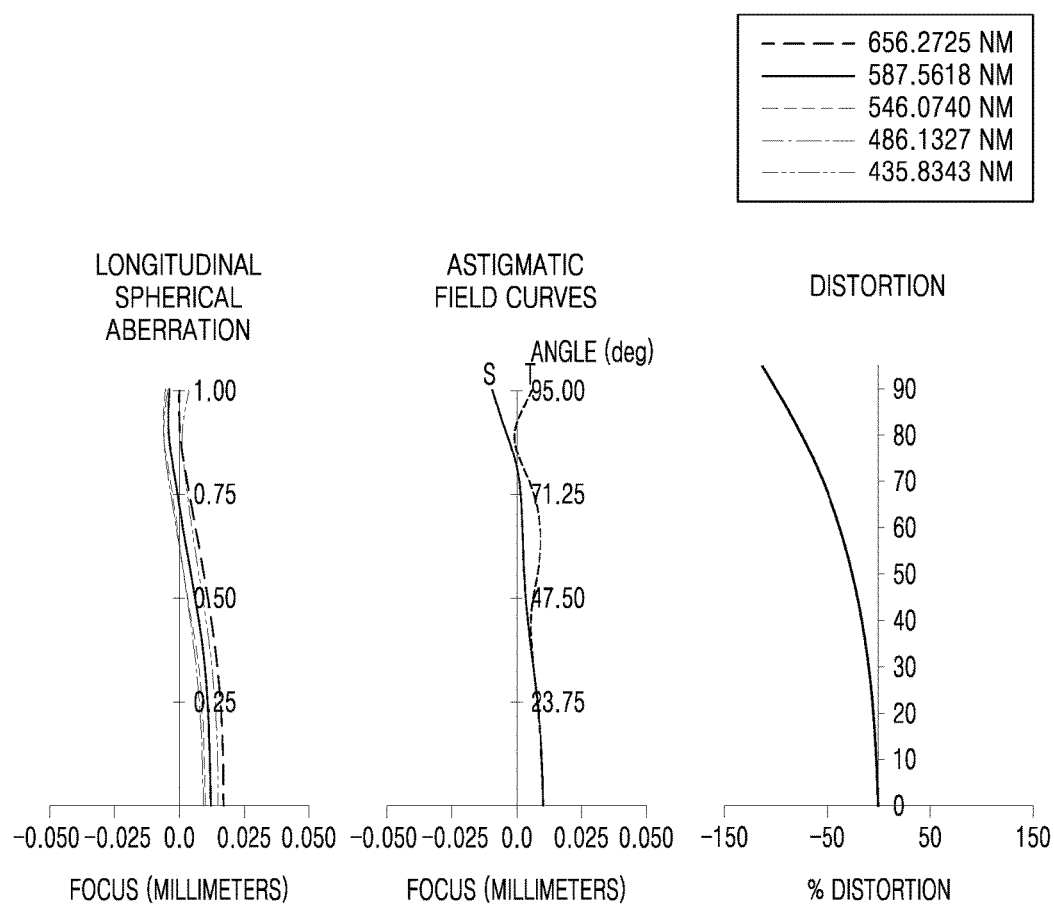
FIG. 16 is an aberration diagram of an optical lens assembly according to the eighth embodiment.

According to the eighth embodiment, at least one optical device 10-8 or 20-8 may be provided between the seventh lens L7-8 and the image plane IMG. FIG. 16 shows the aberration characteristics of the lens assembly shown in FIG. 15.

In the optical lens assembly according to the various disclosed embodiments, the first lens group may have a combination of lenses with strong negative refractive power and lenses with strong positive refractive power and thus may have a super-wide-angle maximum viewing angle of, for example, 130 degrees or more. The optical lens assembly according to the various embodiments may have a super-wide-angle maximum viewing angle of, for example, 130 degrees to 240 degrees and may have a small Petzval sum, thereby allowing spherical aberration control and distortion aberration control. The optical lens assembly according to the various embodiments may include a first air lens having negative refractive power and having a convex surface facing the object side and a second air lens having negative refractive power and having two convex surfaces. Accordingly, there is a small difference between the incidence angle and the emission angle of a peripheral light beam incident on the air lenses, and therefore astigmatic field curvature, astigmatism, and peripheral coma aberration of the peripheral beams may be minimized. Also, when the lens in the second lens group that is closest to the image plane IMG has positive refractive power and has a convex surface facing the image plane IMG, the focal length, the chief ray angle (CRA), and exit pupil characteristics of the light beams may be controlled while properly converging the beam. In another example, when the lens in the second lens group that is closest to the image plane IMG is an aspherical lens, the astigmatic field curvature and the astigmatism may be controlled while reducing the CRA.

The optical lens assembly according to the various disclosed embodiments may satisfy the following conditions. The following conditions will be described with reference to the optical lens assembly 100-1 according to the first embodiment illustrated in FIG. 1. However, the following conditions may also be similarly applied to other embodiments.

$$-80 < Fair1/F < -5 \qquad (1)$$

Herein, "F" denotes the focal length of the optical lens assembly 100-1, and "Fair1" denotes the focal length of the first air lens AL1-1.

When an air gap between adjacent lenses is referred to as an air lens, the refractive index of the lens located on the object side of the air lens is denoted by "n1", the refractive index of air is denoted by "n2", the refractive index of the lens located on the image side of the air lens is denoted by "n3", the length of the air gap along the optical axis is denoted by "L", the curvature radius of the object side surface of the air lens is denoted by "R1", and the curvature radius of the image side surface of the air lens is denoted by "R2", an equation of a focal length E.F.L of the air lens is as follows.

$$E.F.L = \frac{1}{\frac{n_2 - n_1}{n_3 R_1} + \frac{n_3 - n_2}{n_3 R_2} - \frac{(n_2 - n_1)(n_3 - n_2)}{n_2 n_3 R_1 R_2} L} \qquad (A)$$

Herein, since the lens is an air lens, "n2" is "1," i.e. the refractive index of air is 1, and Equation (A) becomes:

$$E.F.L = \frac{1}{\frac{1 - n_1}{n_3 R_1} + \frac{n_3 - 1}{n_3 R_2} - \frac{(1 - n_1)(n_3 - 1)}{n_3 R_1 R_2} L} \qquad (B)$$

Condition (1) imposes conditions on the refractive power of the first air lens AL1-1 of the first lens group G1-1. When the refractive power of the first air lens AL1-1 is great and so that "Fair1/F" value exceeds the upper limit, it is difficult to compensate for astigmatism and peripheral coma aberration. When the "Fair1/F" value exceeds the lower limit, it is difficult to reduce a total length of the lens assembly, thereby preventing miniaturization of the lens assembly. When the optical lens assembly according to various embodiments satisfies Condition (1), the total length may be reduced and a high optical performance may be maintained in the periphery of the image while having a super-wide angle of 130 degrees or more.

The optical lens assembly according to various embodiments may satisfy the following condition.

$$-3.7 < Fair2/F < -1 \qquad (2)$$

Herein, "Fair2" denotes the focal length of the second air lens AL2-1.

The second air lens AL2-1 may compensate the astigmatic field curvature, the astigmatism, and the coma aberration in the image that are left uncompensated by the first air lens AL1-1, and may compensate the spherical aberration and the sagittal coma aberration that are caused by large aperture of the lens assembly, for example when the aperture is about f/1.8.

When the "Fair2/F" value exceeds the upper limit of Condition (2), it is difficult to compensate for aberration; and when the "Fair2/F" value exceeds the lower limit, it is difficult to reduce the total length of the lens assembly.

The optical lens assembly according to various embodiments may satisfy the following condition.

$$1.8 < Fp2/F < 3.7 \qquad (3)$$

Herein, "Fp2" denotes the focal length of the lens in the second lens group G2-1 that is closest to the image plane IMG.

When Condition (3) is satisfied, the CRA, the total length, and the sensitivity may be balanced. When the "Fp2/F" value exceeds the upper limit, the CRA may increase and an optical total length of the lens assembly may increase. When the "Fp2/F" value exceeds the lower limit of Condition (3), the refractive power of the lens in the second lens group G2-1 that is closest to the image plane IMG may increases greatly, and the compensation of the astigmatic field curvature may be difficult. In addition, the sensitivity of the lens may increase and thus manufacturing of the lens may become difficult.

In cases where Conditions (1), (2), and (3) are satisfied, a compact large-aperture system may be produced with aberration compensation and balance while the system also has a large maximum viewing angle. The peripheral magnification, the CRA, and the peripheral performance of the system may be suitable for a super-wide-angle lens that can be used for omnidirectional photographing, for example to capture 360-degree videos suitable for virtual reality.

The optical lens assembly according to various embodiments may satisfy the following condition.

$$-1.0 < (R1air1 - R2air1)/(R1air1 + R2air1) < -0.1 \quad (4)$$

Herein, "R1air1" denotes the curvature radius of the object side surface of the first air lens AL1-1, and "R2air1" denotes the curvature radius of the image side surface of the first air lens AL1-1.

When Condition (4) is satisfied, the first air lens AL1-1 may effectively compensate astigmatism, astigmatic field curvature, and distortions in the capture image. When a "[(R1air1 −R2air1)/(R1air1+R2air1)]" value exceeds the lower limit of Condition (4), the miniaturization of the lens assembly may be difficult to achieve. And when the "[(R1air1−R2air1)/(R1air1+R2air1)]" value exceeds the upper limit, the astigmatism and the astigmatic field curvature may increase.

The optical lens assembly according to various embodiments may satisfy the following condition.

$$-8.0 < (R1air2 - R2air2)/(R1air2 + R2air2) < -2.0 \quad (5)$$

Herein, "R1air2" denotes the curvature radius of the object side surface of the second air lens AL2-1, and "R2air2" denotes the curvature radius of the image side surface of the second air lens AL2-1.

The second air lens AL2-1 may reduce the total length of the optical lens assembly, and may compensate for spherical aberration, astigmatism, sagittal coma, coma aberration, and distortion aberration in the captured image. When the "[(R1air2−R2air2)/(R1air2+R2air2)]" value is smaller than the lower limit of Condition (5), the miniaturization of the lens assembly may be difficult; and when the "[(R1air2−R2air2)/(R1air2+R2air2)]" value exceeds the upper limit, the sensitivity to coma aberration and spherical aberration may increase together with astigmatism and distortions in the image.

Conditions (4) and (5) are the conditions for the curvature radiuses of the first and second air lenses of the first lens group and may correspond to the conditions for aberration control and refractive powers of the air lenses.

The optical lens assembly according to various embodiments may satisfy the following condition.

$$2.5 < F2/F < 5.0 \quad (6)$$

Herein, "F" denotes a focal length of the optical lens assembly, and "F2" denotes a focal length of the second lens group G2-1.

When Condition (6) is satisfied, various aberrations may be compensated by being properly distributed for each of the first lens group and the second lens group, and thus sensitivities of the lenses may be properly maintained in a manufacturing process. Condition (6) relates to the refractive power of the second lens group. When the "F2/F" value is smaller than the lower limit, the total length of the lens assembly may increase and the aberration control thereof may be difficult. When the "F2/F" value exceeds the upper limit thereof, the sensitivity to eccentricity not only in the second lens group but also with respect to the first lens group may increase and thus the manufacturing thereof may be difficult.

The optical lens assembly according to various embodiments may satisfy the following condition.

$$Np1 > 1.75 \quad (7)$$

$$1.0 < Fp1/F < 9 \quad (8)$$

$$Vn1 > 60 \quad (9)$$

Herein, "Np1" denotes a refractive index of the lens having positive refractive power in the first lens group G1-1, "Fp1" denotes the focal length of the lens having positive refractive power in the first lens group G1-1, and "Vn1" denotes an Abbe number of, for example, L3-1 in the first lens group G1-1.

When Conditions (7), (8), and (9) are satisfied, the magnification chromatic aberration in the captured images may be effectively suppressed and the Petzval sum may be small. Accordingly, the optical lens assembly according to various embodiments may have uniform performance in the image periphery. When Condition (7) is satisfied, the Petzval sum may be reduced and thus the aberration compensation may be facilitated. When an "Fp1/F" value exceeds the upper limit or the lower limit of Condition (8), chromatic aberration compensation may be difficult. And when the "Fp1/F" value exceeds the upper limit, the refractive power of the second lens group may increase and thus aberration compensation may be difficult.

The first lens group of the optical lens assembly according to various embodiments may include a double-sided aspherical lens having negative refractive power, and the double-sided aspherical lens may satisfy the following condition. For example, in the first lens group G1-1 of the first embodiment, the double-sided aspherical lens having negative refractive power may be the second lens L2-1.

$$-0.4 < (R1asp1 - R1bestfit1)/(R1asp1) + (R2asp1 - R2bestfit1)/(R2asp1) < 0.8 \quad (10)$$

$$0.8 < EffD2asp1/2Y < 1.3 \quad (11)$$

Herein, "R1asp1" denotes the curvature radius of the object side surface of the double-sided aspherical lens, "R2asp1" denotes the curvature radius of the image side surface of the double-sided aspherical lens, "R1bestfit1" denotes the best-fit curvature radius of the object side surface of the double-sided aspherical lens, "R2bestfit1" denotes the best-fit curvature radius of the image side surface of the double-sided aspherical lens, "EffD2asp1" denotes an effective diameter of the image side surface of the double-sided aspherical lens, and "Y" denotes the image height of the captured image.

With respect to the best-fit curvature radius, in an aspherical lens that is rotationally symmetrical with respect to an optical axis, there is a sphere that simultaneously meets the aspherical surface at the optical axis and the aspherical surface at an effective diameter. In this case, the radius of the sphere is referred to as the best-fit curvature radius.

When Conditions (10) and (11) are satisfied, an aspherical lens may be used in the first lens group to control the distortion aberration. When the lower limit of Condition (10) is exceeded, magnification of the periphery of the image may decrease and thus the angular resolution at the peripheral regions may decrease, causing blur; and when the upper limit is exceeded, the angular resolution of the periphery may increase but the sensitivity of the aspherical surface may increase, causing the manufacturing thereof to be difficult. When Condition (10) is satisfied, the eccentricity sensitivity of the aspherical surface may be suppressed.

Condition (11) defines the size of the aspherical surface of the first lens group. When the lower limit of Condition (11) is exceeded, the size of the aspherical surface may decrease but distortion aberration compensation and peripheral astigmatic field curvature aberration compensation may be difficult; and when the upper limit is exceeded, the size of the aspherical surface may increase and thus the manufacturing thereof may be difficult and the manufacturing cost thereof may also increase.

In the optical lens assembly according to various embodiments, the second lens group may include at least one lens having positive refractive index and at least one lens having negative refractive index and may satisfy the following condition.

$$N2p - N2n < -0.1 \quad (12)$$

$$30 < V2p - V2n \quad (13)$$

Herein, "N2p" denotes a refractive index of the lens having positive refractive index and also having the smallest refractive index in the second lens group, "N2n" denotes a refractive index of the lens having negative refractive index and also having the greatest refractive index in the second lens group, "V2p" denotes an Abbe number of the lens having positive refractive index and also having the smallest refractive index in the second lens group, and "V2n" denotes an Abbe number of the lens having negative refractive index and also having the greatest refractive index in the second lens group.

When Conditions (12) and (13) are satisfied, the longitudinal chromatic aberration and the magnification chromatic aberration in the captured image may be effectively compensated. In such cases, the first lens and second lens of the second lens group towards the object may be joined together to compensate the chromatic aberration. For example, the second lens group G2-6 of the optical lens assembly 100-6 according to the sixth embodiment shown in FIG. 11 includes a triple junction lens with a resin between lenses L6-6 and L8-6 to compensate the chromatic aberration.

Also, the first lens of the second lens group towards the object may have positive refractive power to compensate for astigmatism, sagittal coma, and distortion.

The optical lens assembly according to various embodiments may satisfy the following condition.

$$0.7 < (dY/d\theta)(\theta)/(dY/d\theta)(0) < 1.3 \quad (14)$$

$$0 < \theta < (FOV/2)$$

Herein, "FOV" denotes a maximum viewing angle of the optical lens assembly, and "dY/dθ(θ)" denotes a first-order differential function for θ with respect to a function Y=f(θ) representing the relationship between a viewing angle θ and an image height Y.

Y=f(θ) is a mapping function between the viewing angle θ and the image height Y of the optical lens assembly according to various embodiments. For example, Y=F×θ may be used in the case of linear scaled equidistance mapping, and Y=2F×tan(θ/2) may be used in the case of stereographic mapping. However, the inventive concept is not limited thereto, and various mapping methods may be used herein. When the lower limit of Condition (14) is exceeded, the magnification of the image periphery may be smaller than the magnification of the image center, thereby causing resolution decrease at the periphery; and when the upper limit of Condition (14) is exceeded, the magnification of the image periphery may be greater than the magnification of the image center and thus the control of an eccentricity sensitivity of the lens surfaces may be difficult.

The optical lens assembly according to various embodiments may satisfy the following condition.

$$|RayAngle1/(FOV/2)| < 0.4 \quad (15)$$

$$|RayAngle2/(FOV/2)| < 0.13 \quad (16)$$

Herein, "FOV" denotes a maximum viewing angle of the optical lens assembly, "RayAngle1" denotes an angle at which the chief ray among rays formed at the maximum image height passes through the iris diaphragm, and "RayAngle2" denotes an angle at which the chief ray is incident on the image plane IMG. The chief ray may refer to the ray that passes through the center of the iris diaphragm.

Conditions (15) and (16) define the angles of rays in the optical lens assembly. When the upper limit of Condition (15) is exceeded, the total length of the optical lens assembly may be reduced but the astigmatic field curvature may be sensitive to changes in the distance between the first lens group and the second lens group. When the upper limit of Condition (16) is exceeded, the total length of the optical lens assembly may be effectively reduced but the chief ray angle (CRA) may increase or decrease such that the incident light efficiency of the image sensor is decreased.

The optical lens assembly according to various embodiments may have a small focal length and thus may have a wide range of hyper focal distances. The hyper focal distance may refer to a distance at which an acceptable focus may be taken on all objects. However, for more accurate focusing, focusing may be performed by moving the entire lens in parallel to the optical axis.

In some embodiments, a first lens group having positive refractive power and a second lens group having positive refractive power may be separated from each other to maximize the distance between lenses. The first lens group may include a biconvex air lens having negative refractive power and an air lens having negative refractive power and a convex surface facing the object for image capture. Also, the lens in the second lens group that is closest to the image plane may have positive refractive power and a convex surface facing the image plane. In this case, it may be configured to satisfy Conditions (1), (2), and (3) such that a difference between an incidence angle and an emission angle of a peripheral beam at each lens surface may be reduced to effectively compensate for astigmatic field curvature, astigmatism, and peripheral coma aberration. Also, when lens in the second lens group closest to the image plane has positive refractive power and has a convex surface facing the image plane, focal length, CRA, and exit pupil characteristics may be controlled by properly converging a beam through the lens in the second lens group closest to the image plane.

Also, the optical lens assembly according to some embodiments may include a first lens group having negative refractive power, an iris diaphragm, and a second lens group having positive refractive power, as shown in the embodiment of FIG. 15. In this case, the optical lens assembly may be configured to satisfy Conditions (1), (2), (8), and (10) such that a difference between an incidence angle and an emission angle of a peripheral beam at each lens surface may be reduced to compensate astigmatic field curvature, astigmatism, and peripheral coma aberration. Also, the optical lens assembly according to various embodiments may compensate magnification chromatic aberration in a super-wide-angle region and may compensate sagittal coma and spherical aberration, thereby allowing the lens assembly to user a large aperture while correcting for aberrations in the image.

The optical lens assembly according to various embodiments may be used, for example, in an imaging device. For example, an omnidirectional image of 4 pi radians may be captured by providing an imaging device with a plurality of optical lens assemblies according to various embodiments.

For example, when the optical lens assembly according to various embodiments has a maximum viewing angle of 190 degrees or more, it may acquire an image in a direction perpendicular to the optical axis in a range of 360 degrees. For example, when two optical lens assemblies according to various embodiments are arranged at an angle of 180 degrees, it may be possible to acquire an image having a maximum spherical viewing angle of 4 pi radians. Accordingly, it may be possible to implement an omnidirectional optical system that may capture not only a horizontal 360-degree image in the direction perpendicular to the optical axis but also an image of the entire sphere.

For example, when the number of sides of a regular polyhedron is N, N optical lens assemblies according to various embodiments may be arranged at the respective vertexes of the regular polyhedron. In this case, it may be possible to implement an omnidirectional optical system that may capture an image of the entire sphere by stitching the plurality of images acquired from the N optical lens assemblies accordingly.

Also, for example, assuming a plane parallel to a virtual ground surface and assuming a regular polygon with M sides on the plane, it may be possible to implement an omnidirectional optical system that may capture an image of the entire sphere by mounting M or 2M optical lens assemblies and stitching the plurality of images acquired accordingly.

The aspherical surfaces used in the optical lens assembly according to various embodiments may be defined as follows.

When an optical axis direction is set to an x axis and a direction perpendicular to the optical axis direction is set to a Y axis, an aspherical shape may be represented as the following condition. Herein, "x" denotes the distance in the optical axis direction from the vertex of the lens, "y" denotes the distance in the direction perpendicular to the optical axis, "K" denotes a conic constant, "A, B, C, D, . . . " denote aspherical coefficients, and "c" denotes a reciprocal number (1/R) of the curvature radius at the vertex of the lens.

$$x = \frac{cy^2}{1+\sqrt{1-(K+1)c^2y^2}} + Ay^4 + By^6 + Cy^8 + Dy^{10} + \ldots \quad (17)$$

According to the inventive concept, an optical lens assembly may be implemented by various embodiments according to various designs as follows.

In each embodiment, lens surface numbers S1, S2, S3, Sn ("n" is a natural number) are added sequentially from the object side O to the image side I. Also, "F" denotes the focal length of the optical lens assembly, "fno" denotes an F or aperture number, "FOV" denotes a maximum viewing angle, "R" denotes a curvature radius, "Dn" denotes the thickness of the lens or the air gap between lenses, "Nd" denotes a refractive index, and "Vd" denotes an Abbe number. Also, "ST" denotes an iris diaphragm, and "Obj" denotes an object. Also, "*" denotes an aspherical surface.

First Embodiment

FIG. 1 illustrates an optical lens assembly according to a first embodiment. Table 1 shows, for example, design data of the first embodiment.

F: 1.91 (mm), fno: 1.85, FOV: 190°

TABLE 1

| Lens Surface | R (mm) | Dn (mm) | Nd | Vd |
|---|---|---|---|---|
| Obj | infinity | D1 | | |
| S1 | 13.441 | 0.80 | 1.835 | 42.72 |
| S2 | 4.967 | 2.12 | | |
| *S3 | 12.233 | 0.75 | 1.740 | 59.10 |
| *S4 | 3.016 | 3.05 | | |
| S5 | −4.550 | 2.30 | 1.804 | 46.50 |
| S6 | −10.000 | 0.58 | | |
| *S7 | 6.615 | 1.90 | 1.805 | 40.90 |
| *S8 | −13.478 | 1.40 | | |
| ST(S9) | infinity | 0.11 | 1.511 | 56.16 |
| S10 | infinity | 1.80 | | |
| S11 | 5.196 | 2.20 | 1.618 | 63.39 |
| S12 | −3.500 | 0.45 | 1.847 | 23.78 |
| S13 | 7.906 | 0.75 | | |
| *S14 | 5.025 | 2.80 | 1.689 | 52.67 |
| *S15 | −8.064 | 1.81 | | |
| S16 | infinity | 0.50 | 1.517 | 64.20 |
| S17 | infinity | D2 | | |
| IMG | infinity | 0.01 | | |

Table 2 shows aspherical coefficients in the first embodiment.

TABLE 2

| Lens Surface | K | A | B | C | D | E |
|---|---|---|---|---|---|---|
| S3 | 0.000000 | 1.831003E−03 | −3.217512E−04 | 2.549459E−05 | −1.006344E−06 | 1.588800E−08 |
| S4 | −1.000000 | 4.787824E−03 | 2.620185E−04 | −1.585471E−04 | 2.794546E−05 | −1.452945E−06 |
| S7 | 0.000000 | −2.686071E−04 | 2.524613E−05 | −3.572460E−06 | 0.000000E+00 | 0.000000E+00 |
| S8 | 0.000000 | 7.391219E−04 | 5.583116E−06 | −2.282075E−06 | 0.000000E+00 | 0.000000E+00 |
| S14 | 0.000000 | −2.943548E−03 | 4.497060E−05 | −1.260481E−06 | 0.000000E+00 | 0.000000E+00 |
| S15 | 0.000000 | 1.399891E−03 | −1.114917E−04 | 4.880255E−06 | 0.000000E+00 | 0.000000E+00 |

Table 3 shows a change in a distance D2 between an optical element 20-1 and an image plane IMG and an object distance D1 according to focusing in the first embodiment.

TABLE 3

| D1 | D2 |
|---|---|
| Infinity | 0.52 |
| 200 | 0.54 |

FIG. 2 illustrates longitudinal spherical aberration, astigmatic field curvature, and distortion aberration of the optical lens assembly according to the first embodiment. The longitudinal spherical aberration is measure with lights with wavelengths of 656.2725 nanometers (nm), 587.5618 nm, 546.07400 nm, 486.1327 nm, and 435.8343 nm respectively, and the astigmatic field curvature includes a tangential field curvature T and a sagittal field curvature S. The astigmatic field curvature is measured with light with a wavelength of 587.5618 nm, and the distortion aberration is measured with light with a wavelength of 587.5618 nm.

Second Embodiment

FIG. 3 illustrates an optical lens assembly according to a second embodiment. Table 4 shows, for example, design data of the second embodiment.

F: 2.30 (mm), fno: 1.86, FOV: 180°

TABLE 4

| Lens Surface | R (mm) | Dn (mm) | Nd | Vd |
|---|---|---|---|---|
| Obj | infinity | D1 | | |
| S1 | 14.674 | 1.00 | 1.835 | 42.72 |
| S2 | 6.264 | 2.50 | | |
| S3 | 19.209 | 0.85 | 1.740 | 52.50 |
| S4 | 3.957 | 3.55 | | |
| S5 | −5.492 | 3.00 | 1.804 | 46.50 |
| S6 | −9.505 | 1.27 | | |
| *S7 | 10.038 | 2.20 | 1.805 | 40.90 |
| *S8 | −18.863 | 2.00 | | |
| ST(S9) | infinity | 1.93 | | |
| S10 | 5.625 | 2.50 | 1.593 | 68.62 |
| S11 | −5.035 | 0.10 | | |
| S12 | −4.822 | 0.50 | 1.847 | 23.78 |
| S13 | 7.704 | 1.03 | | |
| *S14 | 5.872 | 3.00 | 1.689 | 52.72 |
| *S15 | −8.058 | 2.53 | | |
| S16 | infinity | 0.50 | 1.517 | 64.20 |
| S17 | infinity | D2 | | |
| S18 | infinity | 0.01 | | |

Table 5 shows aspherical coefficients in the second embodiment.

Table 6 shows a change in a distance D2 between an optical element 20-2 and an image plane IMG and an object distance D1 according to focusing in the second embodiment.

TABLE 6

| D1 | D2 |
|---|---|
| Infinity | 0.52 |
| 200 | 0.55 |

FIG. 4 illustrates a longitudinal spherical aberration, astigmatic field curvature, and distortion aberration of the optical lens assembly according to the second embodiment.

Third Embodiment

FIG. 5 illustrates an optical lens assembly according to a third embodiment. Table 7 shows, for example, design data of the third embodiment.

F: 1.22, fno: 2.07, FOV: 195°

TABLE 7

| Lens Surface | R (mm) | Dn (mm) | Nd | Vd |
|---|---|---|---|---|
| Obj | infinity | D1 | | |
| S1 | 17.000 | 2.00 | 1.773 | 49.62 |
| S2 | 15.000 | 2.50 | | |
| S3 | 11.534 | 0.70 | 1.835 | 42.72 |
| S4 | 4.517 | 2.12 | | |
| *S5 | 28.500 | 0.60 | 1.740 | 52.50 |
| *S6 | 2.510 | 2.31 | | |
| S7 | −4.806 | 0.60 | 1.593 | 68.62 |
| S8 | 4.806 | 0.39 | | |
| *S9 | 3.304 | 2.05 | 1.805 | 40.90 |
| *S10 | −6.711 | 1.38 | | |
| ST(S11) | 1.00E+18 | 1.10 | | |
| S12 | 4.056 | 1.30 | 1.729 | 54.67 |
| S13 | −3.000 | 0.30 | 1.847 | 23.78 |
| S14 | 4.687 | 0.14 | | |
| *S15 | 3.770 | 1.56 | 1.689 | 52.67 |
| *S16 | −4.449 | 1.03 | | |
| S17 | infinity | 0.30 | 1.517 | 64.20 |
| S18 | infinity | 0.30 | | |
| S19 | infinity | 0.50 | 1.517 | 64.20 |
| S20 | infinity | D2 | | |
| IMG | infinity | 0.00 | | |

Table 8 shows aspherical coefficients in the third embodiment.

TABLE 5

| Lens Surface | K | A | B | C | D | E |
|---|---|---|---|---|---|---|
| S7 | 0.000000 | 1.594884E−04 | 3.588710E−06 | 1.191316E−06 | 0.000000E+00 | 1.588800E−08 |
| S8 | 0.000000 | 3.770840E−04 | 7.039784E−06 | 1.429240E−06 | 0.000000E+00 | −1.452945E−06 |
| S14 | 0.000000 | −1.888403E−03 | 5.644874E−05 | −1.614828E−06 | −1.658047E−08 | 0.000000E+00 |
| S15 | 0.000000 | 6.795466E−04 | 2.788013E−06 | 2.066569E−06 | −1.040025E−07 | 0.000000E+00 |

TABLE 8

| Lens Surface | K | A | B | C | D | E |
|---|---|---|---|---|---|---|
| S5 | 0.000000 | 3.499078E−03 | −3.496135E−04 | 3.021686E−05 | −1.495775E−06 | 3.069551E−08 |
| S6 | −1.000000 | 2.859535E−03 | 2.028165E−03 | −7.014050E−04 | 1.378749E−04 | −9.522648E−06 |
| S9 | 0.000000 | −6.826392E−03 | 1.658804E−04 | −4.827604E−05 | 0.000000E+00 | 0.000000E+00 |
| S10 | 0.000000 | 2.438372E−03 | −1.557030E−04 | 3.439486E−06 | 0.000000E+00 | 0.000000E+00 |
| S15 | 0.000000 | −8.874749E−03 | 9.385144E−04 | −6.525304E−05 | 0.000000E+00 | 0.000000E+00 |
| S16 | 0.000000 | 5.213333E−03 | 3.206565E−04 | 0.000000E+00 | 0.000000E+00 | 0.000000E+00 |

Table 9 shows a change in a distance D2 between an optical element 20-3 and an image plane IMG and an object distance D1 according to focusing in the third embodiment.

TABLE 9

| D1 | D2 |
|---|---|
| Infinity | 0.53 |
| 200 | 0.54 |

FIG. 6 illustrates a longitudinal spherical aberration, astigmatic field curvature, and distortion aberration of the optical lens assembly according to the third embodiment.

Fourth Embodiment

FIG. 7 illustrates an optical lens assembly according to a fourth embodiment. Table 10 shows, for example, design data of the fourth embodiment.

F: 1.92, fno: 1.85, FOV: 195°

TABLE 10

| Lens Surface | R (mm) | Dn (mm) | Nd | Vd |
|---|---|---|---|---|
| Obj | infinity | D1 | | |
| S1 | 15.852 | 0.80 | 1.835 | 42.72 |
| S2 | 6.000 | 1.90 | | |
| *S3 | 8.842 | 0.80 | 1.740 | 52.50 |
| *S4 | 3.000 | 3.88 | | |
| S5 | −4.300 | 2.50 | 1.618 | 63.39 |
| S6 | −8.419 | 0.10 | | |
| S7 | 9.299 | 1.30 | 1.847 | 23.78 |
| S8 | −37.126 | 0.50 | | |
| ST(S9) | 1.00E+18 | 2.30 | | |
| S10 | 5.158 | 2.00 | 1.593 | 68.62 |
| S11 | −4.179 | 0.50 | 1.847 | 23.78 |
| S12 | 8.616 | 0.36 | | |
| *S13 | 6.401 | 2.27 | 1.690 | 52.89 |
| *S14 | −5.495 | 3.15 | | |
| S15 | infinity | 0.30 | 1.517 | 64.20 |
| S16 | infinity | 0.30 | | |
| S17 | infinity | 0.50 | 1.517 | 64.20 |
| S18 | infinity | D2 | | |
| IMG | infinity | −0.01 | | |

Table 11 shows aspherical coefficients in the fourth embodiment.

TABLE 11

| Lens Surface | K | A | B | C | D | E |
|---|---|---|---|---|---|---|
| S3 | 0.000000 | −1.062954E−03 | 9.513122E−05 | −4.272500E−06 | 7.038841E−08 | 0.000000E+00 |
| S4 | −1.000000 | 1.748946E−03 | 8.412154E−06 | 4.163666E−05 | −2.452467E−06 | 0.000000E+00 |
| S13 | 0.000000 | −3.229336E−03 | 1.713128E−04 | −1.755860E−05 | 6.737792E−08 | 0.000000E+00 |
| S14 | 0.000000 | 1.163219E−03 | 7.964022E−06 | 8.021292E−07 | −7.233551E−07 | 0.000000E+00 |

Table 12 shows a change in a distance D2 between an optical element 20-4 and an image plane IMG and an object distance D1 according to focusing in the fourth embodiment.

TABLE 12

| D1 | D2 |
|---|---|
| Infinity | 0.54 |
| 200 | 0.55 |

FIG. 8 illustrates a longitudinal spherical aberration, astigmatic field curvature, and distortion aberration of the optical lens assembly according to the fourth embodiment.

Fifth Embodiment

FIG. 9 illustrates an optical lens assembly according to a fifth embodiment. Table 13 shows, for example, design data of the fifth embodiment.

F: 0.95 (mm), fno: 2.26, FOV: 240°

TABLE 13

| Lens Surface | R (mm) | Dn (mm) | Nd | Vd |
|---|---|---|---|---|
| Obj | infinity | D1 | | |
| S1 | 16.715 | 2.00 | 1.835 | 42.72 |
| S2 | 7.155 | 2.38 | | |
| S3 | 11.053 | 0.80 | 1.773 | 49.62 |
| S4 | 3.886 | 2.05 | | |
| *S5 | 35.342 | 0.60 | 1.740 | 59.10 |
| *S6 | 2.700 | 1.98 | | |
| S7 | −4.100 | 1.63 | 1.697 | 55.46 |
| S8 | −45.000 | 0.33 | | |
| *S9 | 3.949 | 2.25 | 1.805 | 40.90 |
| *S10 | −9.538 | 0.87 | | |
| ST(S11) | infinity | 0.80 | | |
| S12 | 2.600 | 2.02 | 1.497 | 81.61 |
| S13 | −2.600 | 0.30 | 1.923 | 20.88 |
| S14 | 5.023 | 0.16 | | |
| *S15 | 4.213 | 1.46 | 1.740 | 59.10 |
| *S16 | −2.860 | 0.71 | | |
| S17 | infinity | 0.30 | 1.517 | 64.20 |
| S18 | infinity | 0.30 | | |
| S19 | infinity | 0.50 | 1.517 | 64.20 |
| S20 | infinity | D2 | | |
| IMG | infinity | −0.01 | | |

Table 14 shows aspherical coefficients in the fifth embodiment.

TABLE 14

| Lens Surface | K | A | B | C | D |
|---|---|---|---|---|---|
| S5 | 0.000000 | 4.892892E−03 | −2.158396E−04 | −9.654502E−06 | 7.019990E−07 |
| S6 | −1.000000 | 4.137913E−03 | 1.999401E−03 | −1.680804E−04 | 1.460570E−05 |
| S9 | 0.000000 | −1.675004E−03 | 4.028469E−04 | −2.526123E−06 | 0.000000E+00 |
| S10 | 0.000000 | 3.439272E−03 | 5.624994E−04 | 1.250070E−06 | 0.000000E+00 |
| S15 | 0.000000 | −6.350440E−03 | 1.350301E−03 | 2.333793E−05 | 0.000000E+00 |
| S16 | 0.000000 | 2.009844E−02 | −3.926191E−04 | 5.144062E−04 | 0.000000E+00 |

Table 15 shows a change in a distance D2 between an optical element 20-5 and an image plane IMG and an object distance D1 according to focusing in the fifth embodiment.

TABLE 15

| D1 | D2 |
|---|---|
| Infinity | 0.54 |
| 200 | 0.54 |

FIG. 10 illustrates a longitudinal spherical aberration, astigmatic field curvature, and distortion aberration of the optical lens assembly according to the fifth embodiment.

Sixth Embodiment

FIG. 11 illustrates an optical lens assembly according to a sixth embodiment. Table 16 shows, for example, design data of the sixth embodiment.

F: 1.16 (mm), fno: 2.09, FOV: 180°

TABLE 16

| Lens Surface | R (mm) | Dn (mm) | Nd | Vd |
|---|---|---|---|---|
| Obj | infinity | D1 | | |
| S1 | 16.846 | 2.00 | 1.773 | 49.62 |
| S2 | 18.096 | 1.01 | | |
| S3 | 13.874 | 0.70 | 1.835 | 42.72 |
| S4 | 4.561 | 2.43 | | |
| *S5 | 28.861 | 0.60 | 1.747 | 45.98 |
| *S6 | 2.507 | 2.32 | | |
| S7 | −4.523 | 0.60 | 1.593 | 65.92 |
| S8 | 5.701 | 0.49 | | |
| *S9 | 3.735 | 2.50 | 1.805 | 40.90 |
| *S10 | −6.521 | 2.00 | | |
| ST(S11) | infinity | 1.00 | | |
| S12 | 4.289 | 1.30 | 1.635 | 61.64 |
| S13 | −2.348 | 0.30 | 1.514 | 42.83 |
| S14 | −3.000 | 0.30 | 1.846 | 23.49 |
| S15 | 6.628 | 0.27 | | |
| *S16 | 3.520 | 1.60 | 1.688 | 53.49 |
| *S17 | −4.789 | 0.95 | | |
| S18 | infinity | 0.30 | 1.517 | 64.20 |
| S19 | infinity | 0.30 | | |
| S20 | infinity | 0.50 | 1.517 | 64.20 |
| S21 | infinity | D2 | | |
| IMG | infinity | 0.01 | | |

TABLE 16-continued

Table 17 shows aspherical coefficients in the sixth embodiment.

TABLE 17

| Lens Surface | K | A | B | C | D | E |
|---|---|---|---|---|---|---|
| S5 | 0.000000 | 6.726419E−03 | −6.098451E−04 | 3.809553E−05 | −1.828694E−06 | 4.028924E−08 |
| S6 | −0.998910 | 8.911296E−03 | 1.086895E−03 | −2.525046E−04 | 4.484948E−05 | −6.622930E−06 |
| S9 | 0.000000 | −4.495174E−03 | 3.087071E−04 | −7.387043E−05 | 0.000000E+00 | 0.000000E+00 |
| S10 | 0.000000 | 2.973270E−03 | −2.102152E−05 | −3.552921E−05 | 0.000000E+00 | 0.000000E+00 |
| S16 | 0.000000 | −8.103281E−03 | 7.473062E−04 | −5.655188E−05 | 0.000000E+00 | 0.000000E+00 |
| S17 | 0.000000 | 5.857227E−03 | 4.502287E−04 | −2.698783E−05 | 0.000000E+00 | 0.000000E+00 |

Table 18 shows a change in a distance D2 between an optical element 20-6 and an image plane IMG and an object distance D1 according to focusing in the sixth embodiment.

TABLE 18

| D1 | D2 |
|---|---|
| Infinity | 0.52 |
| 200 | 0.53 |

FIG. 12 illustrates a longitudinal spherical aberration, astigmatic field curvature, and distortion aberration of the optical lens assembly according to the sixth embodiment.

Seventh Embodiment

FIG. 13 illustrates an optical lens assembly according to a seventh embodiment. Table 19 shows, for example, design data of the seventh embodiment.

F: 1.22 (mm), fno: 2.06, FOV: 180°

TABLE 19

| Lens Surface | R (mm) | Dn (mm) | Nd | Vd |
|---|---|---|---|---|
| Obj | infinity | D1 | | |
| S1 | 10.430 | 0.81 | 1.835 | 42.72 |
| S2 | 4.347 | 2.03 | | |
| S3 | 30.000 | 0.60 | 1.740 | 49.09 |
| S4 | 2.563 | 2.31 | | |
| S5 | −4.761 | 0.60 | 1.593 | 68.62 |

TABLE 19-continued

| Lens Surface | R (mm) | Dn (mm) | Nd | Vd |
|---|---|---|---|---|
| S6 | 5.142 | 0.49 | | |
| S7 | 3.127 | 1.80 | 1.805 | 40.89 |
| S8 | −5.277 | 0.10 | | |
| *S9 | −5.118 | 0.80 | 1.630 | 36.38 |
| *S10 | −8.580 | 1.22 | | |
| ST(S11) | 1.00E+18 | 0.80 | | |
| S12 | 3.840 | 1.30 | 1.726 | 54.86 |
| S13 | −2.500 | 0.30 | 1.847 | 23.78 |
| S14 | 5.470 | 0.40 | | |
| S15 | 3.202 | 1.58 | 1.689 | 52.67 |
| S16 | −8.372 | 0.70 | | |
| S17 | infinity | 0.30 | 1.517 | 64.20 |
| S18 | infinity | 0.30 | | |
| S19 | infinity | 0.50 | 1.517 | 64.20 |
| S20 | infinity | D2 | | |
| IMG | infinity | 0.01 | | |

Table 20 shows aspherical coefficients in the seventh embodiment.

TABLE 20

| Lens Surface | K | A | B | C | D | E |
|---|---|---|---|---|---|---|
| S3 | 0.000000 | 6.193469E−03 | −6.749017E−04 | 4.578257E−05 | −1.796837E−06 | 3.322119E−08 |
| S4 | −0.930400 | 7.405139E−03 | 4.780160E−04 | −1.276694E−04 | 9.690845E−06 | 1.276369E−07 |
| S7 | 0.000000 | −6.914827E−03 | 5.318976E−05 | −3.139180E−05 | 0.000000E+00 | 0.000000E+00 |
| S8 | 0.000000 | 2.895382E−03 | −1.991546E−04 | 1.810175E−05 | 0.000000E+00 | 0.000000E+00 |
| S15 | 0.000000 | −6.997389E−03 | 5.001322E−04 | −5.010200E−05 | 0.000000E+00 | 0.000000E+00 |
| S16 | 0.000000 | 7.715688E−03 | −2.945863E−04 | 1.107119E−05 | 0.000000E+00 | 0.000000E+00 |

Table 21 shows a change in a distance D2 between an optical element 20-7 and an image plane IMG and an object distance D1 according to focusing in the seventh embodiment.

TABLE 21

| D1 | D2 |
|---|---|
| Infinity | 0.52 |
| 200 | 0.53 |

FIG. 14 illustrates a longitudinal spherical aberration, astigmatic field curvature, and distortion aberration of the optical lens assembly according to the seventh embodiment.

Eighth Embodiment

FIG. 15 illustrates an optical lens assembly according to an eighth embodiment. Table 22 shows design data of the eighth embodiment.

F: 1.90 (mm), fno: 1.87, FOV: 190°

TABLE 22

| Lens Surface | Radius | Thick | Ind | Abv |
|---|---|---|---|---|
| Obj | infinity | D1 | | |
| S1 | 14.951 | 1.00 | 1.835 | 42.72 |
| S2 | 5.923 | 2.17 | | |
| *S3 | 9.828 | 0.80 | 1.740 | 52.50 |
| *S4 | 3.000 | 4.11 | | |
| S5 | −4.396 | 2.48 | 1.687 | 57.36 |
| S6 | −9.010 | 0.10 | | |
| S7 | 6.050 | 1.32 | 1.813 | 25.11 |
| S8 | 42.854 | 0.50 | | |
| ST(S9) | infinity | 2.39 | | |
| S10 | 5.332 | 2.05 | 1.593 | 68.62 |
| S11 | −3.947 | 0.40 | 1.847 | 23.78 |
| S12 | 10.859 | 0.42 | | |
| *S13 | 5.677 | 2.56 | 1.690 | 52.89 |
| *S14 | −6.858 | 3.07 | | |
| S15 | infinity | 0.30 | 1.517 | 64.20 |
| S16 | infinity | 0.30 | | |
| S17 | infinity | 0.50 | 1.517 | 64.20 |

TABLE 22-continued

| Lens Surface | Radius | Thick | Ind | Abv |
|---|---|---|---|---|
| S18 | infinity | D2 | | |
| IMG | infinity | −0.01 | | |

Table 23 shows aspherical coefficients in the eighth embodiment.

TABLE 23

| Lens Surface | K | A | B | C | D |
|---|---|---|---|---|---|
| S3 | 0.000000 | −1.652100E−04 | 3.295791E−06 | −5.704228E−07 | 1.523762E−08 |
| S4 | −1.000000 | 2.143847E−03 | 8.511204E−05 | 3.360090E−06 | −2.523962E−07 |
| S7 | 0.000000 | 4.269250E−04 | 4.238474E−05 | 0.000000E+00 | 0.000000E+00 |
| S8 | 0.000000 | 8.867001E−04 | 6.505277E−05 | 0.000000E+00 | 0.000000E+00 |
| S13 | 0.000000 | −2.658305E−03 | 6.127894E−05 | −4.127637E−06 | −2.994694E−07 |
| S14 | 0.000000 | 1.489622E−03 | −3.994775E−05 | 2.102051E−07 | −3.535486E−07 |

Table 24 shows a change in a distance D2 between an optical element 20-8 and an image plane IMG and an object distance D1 according to focusing in the eighth embodiment.

TABLE 24

| D1 | D2 |
|---|---|
| Infinity | 0.54 |
| 200 | 0.56 |

FIG. 16 illustrates a longitudinal spherical aberration, astigmatic field curvature, and distortion aberration of the optical lens assembly according to the eighth embodiment.

Table 25 shows that the optical lens assemblies according to various embodiments satisfy Conditions (1) to (16). "ex1" stands for Example 1 or the first embodiment, "ex2" indicates the second embodiment, and so forth.

TABLE 25

| Condition | | Embodiments | | | | | | | |
|---|---|---|---|---|---|---|---|---|---|
| No. | Conditions | ex1 | ex2 | ex3 | ex4 | ex5 | ex6 | ex7 | ex8 |
| 1 | Fair1/F | −10.580 | −9.208 | −9.534 | −27.178 | −68.024 | −10.304 | −8.979 | −21.450 |
| 2 | Fair2/F | −1.701 | −1.815 | −2.583 | −1.594 | −3.315 | −2.630 | −2.611 | −1.578 |
| 3 | Fp2/F | 2.570 | 2.340 | 2.611 | 2.415 | 2.642 | 2.745 | 2.892 | 2.577 |
| 4 | (R1air1 − R2air1)/(R1air1 + R2air1) | −0.422 | −0.508 | −0.726 | −0.192 | −0.802 | −0.727 | −0.747 | −0.248 |
| 5 | (R1air2 − R2air2)/(R1air2 + R2air2) | −4.932 | −6.159 | −3.186 | −5.615 | −4.857 | −3.488 | −3.332 | −5.297 |
| 6 | F2/F | 3.504 | 3.357 | 3.187 | 3.158 | 4.348 | 3.395 | 3.286 | 3.213 |
| 7 | Np1 | 1.805 | 1.805 | 1.805 | N/A | 1.805 | 1.805 | 1.805 | 1.813 |
| 8 | Fp1/F | 3.003 | 3.644 | 2.461 | N/A | 8.664 | 2.837 | 2.191 | 4.453 |
| 9 | Vn1 | N/A | N/A | 68.620 | 63.390 | N/A | 65.920 | 68.620 | N/A |
| 10 | (R1asp1 − R1bestfit1)/(R1asp1) + (R2asp1 − R2bestfit1)/(R2asp1) | −0.041 | N/A | 0.455 | −0.270 | 0.644 | 0.528 | 0.453 | −0.286 |
| 11 | EffD2asp1/2Y | 0.920 | N/A | 1.054 | 1.021 | 0.913 | 1.156 | 1.186 | 1.077 |
| 12 | N2p − N2n | −0.229 | −0.254 | −0.118 | −0.254 | −0.426 | −0.211 | −0.121 | −0.254 |
| 13 | V2p − V2n | 39.610 | 44.830 | 30.890 | 44.840 | 60.730 | 38.150 | 31.080 | 44.840 |
| 15 | \|RayAngle1/(FOV/2)\| | 0.302 | 0.296 | 0.358 | 0.302 | 0.233 | 0.352 | 0.365 | 0.314 |
| 15 | \|RayAngle2/(FOV/2)\| | 0.020 | 0.016 | 0.126 | 0.059 | 0.125 | 0.080 | 0.109 | 0.031 |

The optical lens assemblies according to various embodiments may be applied, for example, to electronic apparatuses that have image sensors. The optical lens assemblies according to various embodiments may be used in various electronic apparatuses such as digital cameras, interchangeable lens cameras, video cameras, mobile phone cameras, and compact mobile device cameras.

Figure 17:
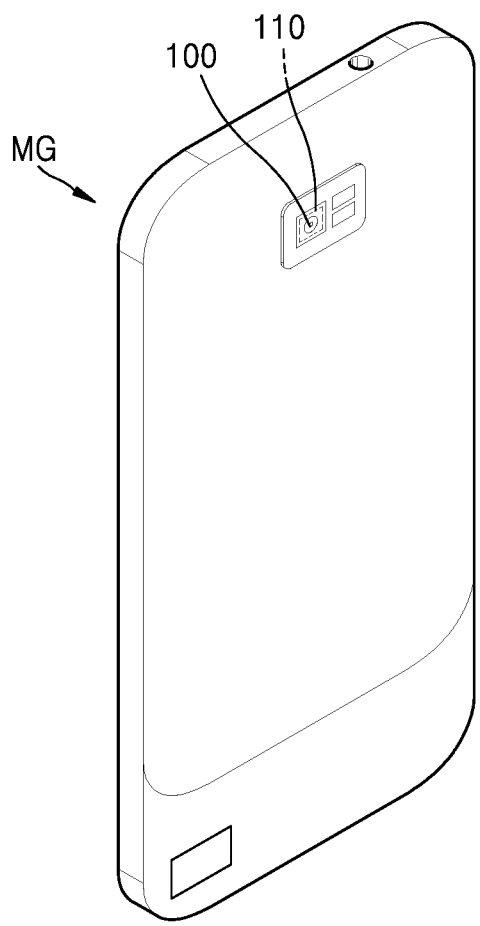
FIG. 17 illustrates an electronic apparatus including an optical lens assembly according to one embodiment of the present disclosure.

FIG. 17 illustrates an example of an electronic apparatus MG including an optical lens assembly according to embodiments. Although FIG. 17 illustrates an example in which the electronic apparatus MG is a mobile phone, the inventive concept is not limited thereto. The electronic apparatus MG may include at least one optical lens assembly 100 and an image sensor 110 that receives an image formed by the at least one optical lens assembly 100 and converts the received image into an electrical image signal. The optical lens assemblies described with reference to FIGS. 1 to 16 may be used as the optical lens assembly 100. Therefore, a photographing apparatus capable of high-performance photographing may be implemented by applying the optical lens assembly according to various embodiments to a photographing apparatus such as a compact digital camera and a mobile phone.

The image sensor 110 may include an infrared detection pixel. The infrared detection pixel may enable infrared photographing in a situation where visible light photographing is difficult indoors or at night. A color filter included in the image sensor may transmit not only lights of wavelengths corresponding to red, green, and blue, but also infrared wavelengths. Thus, when infrared wavelengths are not blocked, the infrared light may generate noise for color reproduction. Infrared rays may be blocked by a separate filter or coating. However, in some embodiments, an infrared blocking film may be arranged at a position between a first lens group and a second lens group, and the infrared blocking film may be moved by an actuator. Accordingly, as the actuator operates, the infrared blocking film may be moved away from the optical path. In the case of using an image sensor including an infrared detection pixel, when photographing lights of visible light wavelengths, infrared rays may be blocked by an infrared blocking film. In an embodiment where an infrared blocking film is not used, infrared noise may be removed by a processor.

Figure 18:
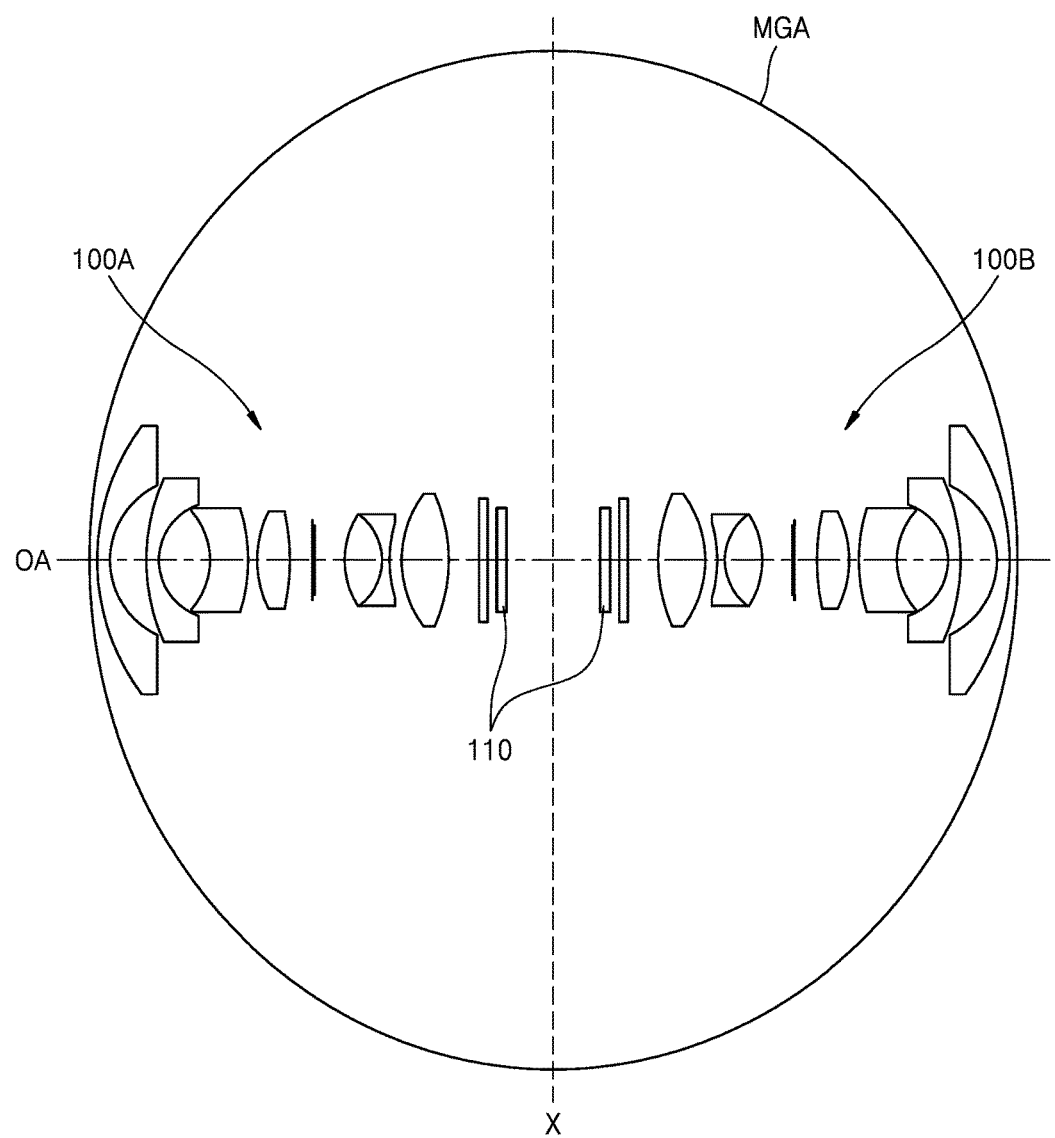
FIG. 18 illustrates an electronic apparatus including two optical lens assemblies according to one embodiment of the present disclosure.

FIG. 18 illustrates another example of an electronic apparatus MGA including an optical lens assembly according to embodiments. The electronic apparatus MGA may include a plurality of optical lens assemblies according to various embodiments. For example, a first optical lens assembly 100A and a second optical lens assembly 100B may be arranged on an optical axis OA. For example, the first optical lens assembly 100A and the second optical lens assembly 100B may be arranged on a straight line such that their respective image sensors 110 face each other. Accordingly, omnidirectional photographing may be performed. The arrangement method is not limited thereto, and two optical lens assemblies or three or more optical lens assemblies may be arranged in various ways. The optical lens assemblies according to various embodiments may be applied, for example, to mobile devices, virtual reality devices, augmented reality devices, and surround view input devices of vehicles.

Figure 19:
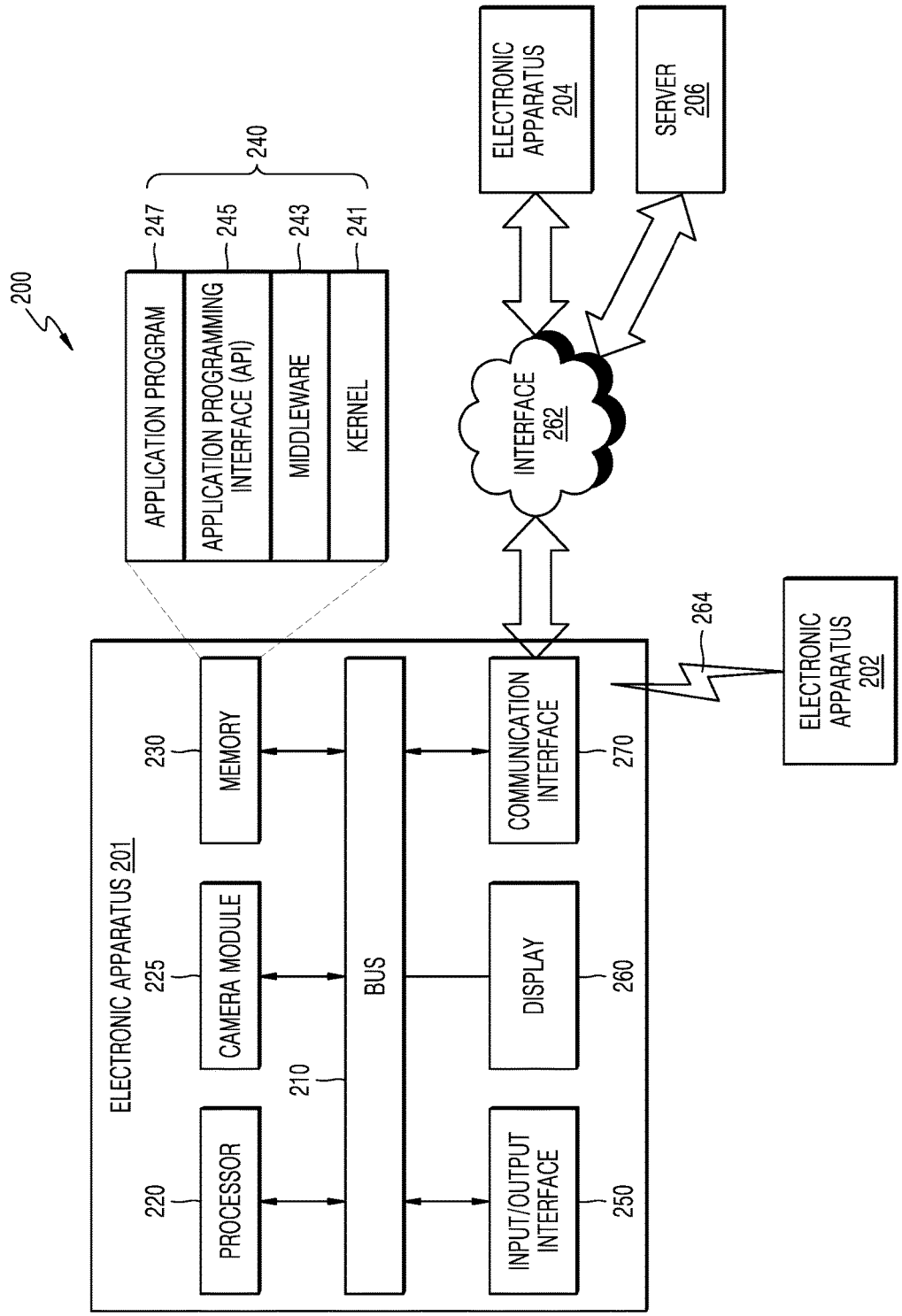
FIG. 19 illustrates a network environment system according to various embodiments.

An electronic apparatus 201 in a network environment 200 according to various embodiments will be described with reference to FIG. 19. Referring to FIG. 19, the electronic apparatus 201 may include a bus 210, a processor 220, a camera module 225, a memory 230, an input/output (I/O) interface 250, a display 260, and a communication interface 270. In some embodiments, the electronic apparatus 201 may not include at least one of the above components or may further include other components.

The bus 210 may include, for example, a circuit for connecting the above components (210 to 270) and transmitting communication information (e.g., control messages and/or data) between the above components.

The processor 220 may include at least one of a central processing unit (CPU), an application processor (AP), or a communication processor (CP). For example, the processor 220 may execute control of one or more other components of the electronic apparatus 201 and/or data processings or operations related to communication. The processor 220 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. §101.

For example, the camera module 225 may be configured to capture a still image and a moving image (video). According to an embodiment, the camera module 225 may include one or more image sensors (e.g., a front sensor or a rear sensor), a lens, an image signal processor (ISP), or a flash (e.g., a light-emitting diode (LED) or a xenon lamp). For example, the optical lens assemblies according to various embodiments may be applied to the camera module 225.

The memory 230 may include a volatile memory and/or a nonvolatile memory. For example, the memory 230 may store data or commands related to one or more other components of the electronic apparatus 201. According to an embodiment, the memory 230 may store software and/or a program 240. The program 240 may include, for example, a kernel 241, middleware 243, an application programming interface (API) 245, and/or an application program (or "application") 247. At least a portion of the kernel 241, the middleware 243, and the API 245 may be referred to as an operating system (OS).

For example, the kernel 241 may control or manage system resources (e.g., the bus 210, the processor 220, the memory 230, and/or other hardware and software resources) used to execute operations or functions implemented in other programs (e.g., the middleware 243, the API 245, or the application program 247). Also, the kernel 241 may provide an interface for controlling or managing the system resources when the middleware 243, the API 245, or the application program 247 accesses each component of the electronic apparatus 201.

For example, the middleware 243 may perform a relay function so that the API 245 or the application program 247 may communicate data with the kernel 241.

Also, the middleware 243 may process one or more operation requests received from the application program 247 according to the priority thereof. For example, the middleware 243 may give at least one of the application programs 247 the priority to use the system resource (e.g., the bus 210, the processor 220, or the memory 230) of the electronic apparatus 201. For example, the middleware 243 may perform scheduling or load balancing on the one or more operation requests by processing the one or more operation requests according to the priority given to the at least one.

For example, the API 245 may be an interface for the application 247 to control a function provided by the kernel 241 or the middleware 243, and may include at least one interface or function (e.g., instructions) for file control, window control, image processing, or character control.

For example, the I/O interface 250 may function as an interface for transmitting a command or data input from the user or another external device to one or more other components of the electronic apparatus 201. Also, the I/O interface 250 may output a command or data received from one or more other components of the electronic apparatus 201 to the user or another external device.

The display 260 may include, for example, a liquid crystal display (LCD), a light-emitting diode (LED) display, an organic light-emitting diode (OLED) display, a microelectromechanical system (MEMS) display, or an electronic paper display. For example, the display 260 may display various types of content (e.g., texts, images, videos, icons, or symbols) to the user. For example, the display 260 may include a touchscreen and may receive a touch, gesture, proximity, or hovering input by using an electronic pen or a portion of the body of the user.

For example, the communication interface 270 may set the communication between the electronic apparatus 201 and an external device (e.g., a first external electronic apparatus 202, a second external electronic apparatus 204, or a server 206). For example, by wireless communication or wired communication, the communication interface 270 may be connected to a network 262 to communicate with the external device (e.g., the second external electronic apparatus 204 or the server 206).

The wireless communication may use, for example, at least one of Long-Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), and Global System for Mobile communication (GSM) as cellular communication protocol. Also, the wireless communication may include, for example, short-range communication 264. The short-range communication 264 may include, for example, at least one of Wireless Fidelity (WiFi), Bluetooth, Near-Field Communication (NFC) and Global Navigation Satellite System (GNSS). The GNSS may include, for example, at least one of Global Positioning System (GPS), Global Navigation Satellite System (GLONASS), BeiDou Navigation Satellite System (hereinafter referred to as "BeiDou"), and Galileo (or the European global satellite-based navigation system) according to regions or bandwidths. Hereinafter, the term "GPS" may be interchangeably used with the term "GNSS". The wired communication may include, for example, at least one of universal serial bus (USB), high definition multimedia interface (HDMI), recommended standard-232 (RS-232), and plain old telephone service (POTS). The network 262 may include, for example, at least one of a telecommunications network, a computer network (e.g., Local Area Network (LAN) or Wide Area Network (WAN)), the Internet, and a telephone network.

Each of the first and second external electronic apparatuses 202 and 204 may be similar to or different in type from the electronic apparatus 201. According to an embodiment, the server 206 may include a group of one or more servers. According to various embodiments, all or some of the operations executed in the electronic apparatus 201 may be executed in one or more other electronic apparatuses (e.g., the external electronic apparatus 202 or 204 or the server 206). According to an embodiment, when the electronic apparatus 201 needs to perform a function or a service automatically or at the request, the electronic apparatus 201 may request at least some functions related thereto from other devices (e.g., the external electronic apparatus 202 or 204 or the server 206) in addition to or instead of directly executing the function or the service. The other electronic apparatuses (e.g., the external electronic apparatus 202 or 204 or the server 206) may execute the requested function or the additional function and transmit the execution results to the electronic apparatus 201. The electronic apparatus 201 may provide the requested function or service by processing the received execution results additionally or without change. For this purpose, for example, cloud computing, distributed computing, or client-server computing technology may be used.

Figure 20:
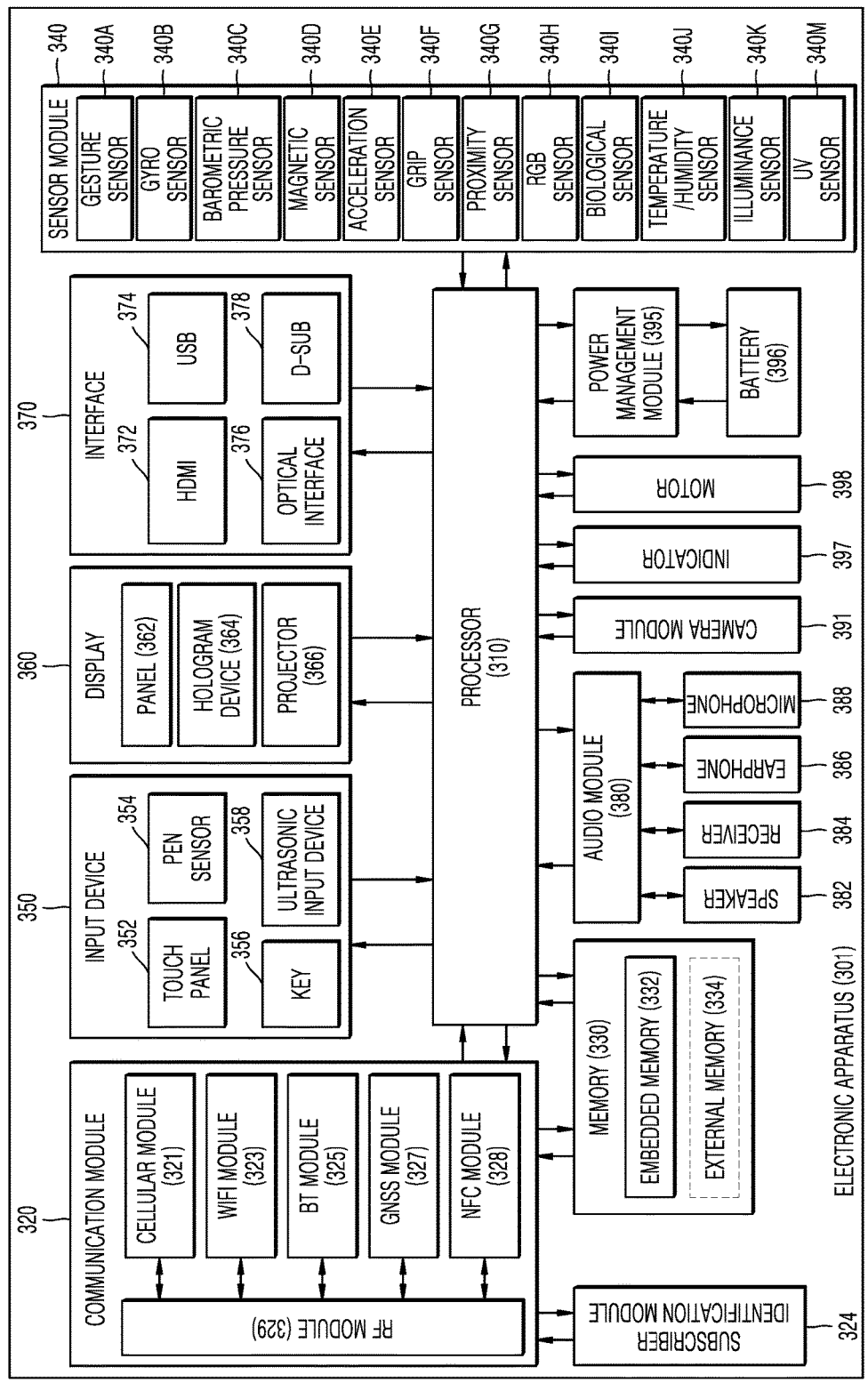
FIG. 20 is a block diagram of an electronic apparatus according to various embodiments.

FIG. 20 is a block diagram of an electronic apparatus 301 according to various embodiments. Referring to FIG. 20, the electronic apparatus 301 may include, for example, all or some of the electronic apparatus 201 illustrated in FIG. 19. The electronic apparatus 301 may include at least one processor (e.g., application processor (AP)) 310, a communication module 320, a subscriber identification module (SIM) 324, a memory 330, a sensor module 340, an input device 350, a display 360, an interface 370, an audio module 380, a camera module 391, a power management module 395, a battery 396, an indicator 397, and a motor 398.

For example, by driving an operating system (OS) or an application program, the processor 310 may control a plurality of hardware or software components connected to the processor 310 and perform various data processings and operations. The processor 310 may be implemented, for example, as a system on chip (SoC). According to an embodiment, the processor 310 may further include a graphic processing unit (GPU) and/or an image signal processor. The processor 310 may include at least some (e.g., cellular module 321) of the components illustrated in FIG. 18. The processor 310 may load a command or data received from at least one of other components (e.g., a nonvolatile memory) into a volatile memory and process the loaded data, and the processor 310 may store various data in the nonvolatile memory.

The communication module 320 may have an identical or similar configuration to the communication interface 270 of FIG. 19. The communication module 320 may include, for example, the cellular module 321, a WiFi module 323, a Bluetooth (BT) module 325, a GNSS module 327 (e.g., a GPS module, a GLONASS module, a BeiDou module, or a Galileo module), an NFC module 328, and a radio frequency (RF) module 329.

The cellular module 321 may provide, for example, a voice call service, a video call service, a text message service, or an Internet service through a communication network. According to an embodiment, the cellular module 321 may identify and authenticate the electronic apparatus 301 in the communication network by using the subscriber identification module (e.g., SIM card) 324. According to an embodiment, the cellular module 321 may perform at least some of the functions that may be provided by the processor 310. According to an embodiment, the cellular module 321 may include a communication processor (CP).

Each of the WiFi module 323, the BT module 325, the GNSS module 327, and the NFC module 328 may include, for example, a processor for processing data transmitted/received through the corresponding module. According to some embodiments, at least some (e.g., two or more) of the cellular module 321, the WiFi module 323, the BT module 325, the GNSS module 327, and the NFC module 328 may be included in an integrated chip (IC) or an IC package.

The RF module 329 may transmit/receive, for example, a communication signal (e.g., an RF signal). The RF module 329 may include, for example, a transceiver, a power amplifier module (PAM), a frequency filter, a low-noise amplifier (LNA), or an antenna. According to other embodiments, at least one of the cellular module 321, the WiFi module 323, the BT module 325, the GNSS module 327, and the NFC module 328 may transmit/receive an RF signal through a separate RF module.

For example, the subscriber identification module 324 may include an embedded SIM and/or a card including an SIM, and may include unique identification information (e.g., integrated circuit card identifier (ICCID)) or subscriber information (e.g., international mobile subscriber identity (IMSI)).

The memory 330 may include, for example, an internal memory 332 or an external memory 334. The internal memory 332 may include, for example, at least one of volatile memories (e.g., dynamic random-access memories (DRAMs), static RAMs (SRAMs), or synchronous DRAMs (SDRAMs)) and nonvolatile memories (e.g., one-time programmable read-only memories (OTPROMs), programmable ROMs (PROMs), erasable and programmable ROMs (EPROMs), electrically erasable and programmable ROMs (EEPROMs), mask ROMs, flash ROMs, flash memories (e.g., NAND flash memories or NOR flash memories), hard disk drives (HDDs), or solid state drives (SSDs)).

The external memory 334 may include, for example, a flash drive such as compact flash (CF), secure digital (SD), micro secure digital (micro-SD), mini secure digital (mini-SD), extreme digital (xD), multimedia card (MMC), or memory stick. The external memory 334 may be operatively and/or physically connected to the electronic apparatus 301 through various interfaces.

For example, the sensor module 340 may measure a physical quantity or detect an operation state of the electronic apparatus 301 and convert the measured or detected information into an electrical signal. The sensor module 340 may include, for example, at least one of a gesture sensor 340A, a gyro sensor 340B, a pressure sensor 340C, a magnetic sensor 340D, an acceleration sensor 340E, a grip sensor 340F, a proximity sensor 340G, a color sensor 340H (e.g., an red/green/blue (RGB) sensor), a biometric sensor 340I, a temperature/humidity sensor 340J, an illumination sensor 340K, and an ultraviolet (UV) sensor 340M. Additionally or alternatively, the sensor module 340 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 340 may further include a control circuit configured to control at least one sensor included therein. In some embodiments, the electronic apparatus 301 may further include a processor, which is configured separately or as a portion of the processor 310 to control the sensor module 340, to control the sensor module 340 while the processor 310 is in a sleep state.

The input device 350 may include, for example, a touch panel 352, a (digital) pen sensor 354, a key 356, or an ultrasonic input device 358. The touch panel 352 may include, for example, at least one of a capacitive touch panel, a resistive touch panel, an infrared touch panel, and an ultrasonic touch panel. Also, the touch panel 352 may further include a control circuit. The touch panel 352 may further include a tactile layer configured to provide a tactile response to the user.

For example, the (digital) pen sensor 354 may be a portion of the touch panel 352 or may include a separate recognition sheet. The key 356 may include, for example, a physical button, an optical key, or a keypad. The ultrasonic input device 358 may detect an ultrasonic wave generated by an input tool through a microphone 388 and detect data corresponding to the detected ultrasonic wave.

The display 360 may include a panel 362, a hologram device 364, or a projector 366. The panel 362 may include an identical or similar configuration to the display 260 of FIG. 19. For example, the panel 362 may be implemented to be flexible, transparent, or wearable. The panel 362 and the touch panel 352 may be configured as one module. According to an embodiment, the panel 362 may include a pressure sensor (or a force sensor) that may measure a pressure strength of a user touch. The pressure sensor may be implemented integrally with the touch panel 352, or may be implemented as one or more sensors separately from the touch panel 352. The hologram device 364 may display a stereoscopic image in the air by using light interference. The projector 366 may display an image by projecting light onto a screen. For example, the screen may be located inside or outside the electronic apparatus 301. According to an embodiment, the display 360 may further include a control circuit for controlling the panel 362, the hologram device 364, or the projector 366.

The interface 370 may include, for example, a high-definition multimedia interface (HDMI) 372, a universal serial bus (USB) 374, an optical interface 376, or a D-subminiature (D-SUB) 378. For example, the interface 370 may be included in the communication interface 270 illustrated in FIG. 19. Additionally or alternatively, the interface 370 may include, for example, a mobile high-definition link (MHL) interface, a secure digital (SD) card/multimedia card (MMC) interface, or an infrared data association (IrDA) standard interface.

For example, the audio module 380 may perform bidirectional conversion between a sound and an electrical signal. For example, at least some components of the audio module 380 may be included in the I/O interface 250 illustrated in FIG. 19. For example, the audio module 380 may process sound information that is input or output through a speaker 382, a receiver 384, an earphone 386, or the microphone 388.

For example, the camera module 391 may be configured to capture a still image and a moving image (video). According to an embodiment, the camera module 391 may include one or more image sensors (e.g., a front sensor or a rear sensor), a lens, an image signal processor (ISP), or a flash (e.g., a light-emitting diode (LED) or a xenon lamp). For example, the optical lens assemblies according to various embodiments may be applied to the camera module 391.

For example, the power management module 395 may manage the power of the electronic apparatus 301. The electronic apparatus 301 may be, but is not limited to, an electronic apparatus that is powered by a battery. According to an embodiment, the power management module 395 may include a power management integrated circuit (PMIC), a charger integrated circuit (IC), or a battery or fuel gauge. The PMIC may have a wired and/or wireless charge mode. For example, the wireless charge mode may include a magnetic resonance mode, a magnetic induction mode, or an electromagnetic wave mode and may further include an additional wireless charge circuit such as a coil loop, a resonant circuit, or a rectifier. For example, the battery gauge may be configured to measure a residual capacity, a charged voltage, a current, or a temperature of the battery 396. The battery 396 may include, for example, a rechargeable battery and/or a solar battery.

The indicator 397 may indicate a particular state of the electronic apparatus 301 or a portion thereof (e.g., the processor 310), such as a booting state, a message state, or a charge state. For example, the motor 398 may be configured to convert an electrical signal into a mechanical vibration and generate a vibration or a haptic effect. Although not illustrated, the electronic apparatus 301 may include a processing device (e.g., a GPU) for supporting a mobile TV. For example, the processing device for supporting a mobile TV may process media data according to the standards such as digital multimedia broadcasting (DMB), digital video broadcasting (DVB), or MediaFLO™.

Each of the elements described herein may be configured by one or more components, and the names of the elements may vary according to the type of the electronic apparatus. According to various embodiments, the electronic apparatus may be configured to include at least one of the elements described herein, and some elements may be omitted or additional elements may be further included. Also, according to various embodiments, some of the elements of the electronic apparatus may be combined into one entity to perform the same functions as the previous elements prior to the combination thereof.

The term "module" used herein may refer to, for example, a unit including hardware, software, firmware, or any combination thereof. For example, the term "module" may be interchangeably used with terms such as "unit," "logic,", "logical block," "component," or "circuit". The "module" may be a portion or a minimum unit of an integrated component. The "module" may be a portion or a minimum unit for performing one or more functions. The "module" may be implemented mechanically or electronically. For example, the "module" may include at least one of an application-specific integrated circuit (ASIC) chip, a field-programmable gate array (FPGA), or a programmable-logic device for performing some operations, which are known or to be developed.

For example, at least a portion of the apparatus (e.g., modules or functions thereof) or method (e.g., operations) according to various embodiments may be implemented in the form of a program module by instructions stored in computer-readable storage media. When the instructions are executed by the processor (e.g., the processor 220 of FIG. 19), the one or more processors may perform a function corresponding to the instructions. The computer-readable storage media may include, for example, the memory 230.

The computer-readable storage media may include, for example, hard disks, floppy disks, magnetic media (e.g., magnetic tapes), optical media (e.g., compact disk read-only memory (CD-ROM), digital versatile disk (DVD), magneto-optical media (e.g., floptical disks), or hardware devices (e.g., read-only memory (ROM), random-access memory (RAM), or flash memories). Also, the program commands may include machine language codes that may be generated by a compiler, and high-level language codes that may be executed by a computer by using an interpreter. The hardware device may be configured to operate as one or more software modules in order to perform the operation of various embodiments, and vice versa. The program module or the module according to various embodiments may include at least one of the above elements, some of the above elements may be omitted, or additional other elements may be further included therein. The operations performed by the module, the program module, or other elements according to various embodiments may be executed in a sequential, parallel, repeated, or heuristic manner. Also, some operations may be executed in different order or omitted, or other operations may be additionally executed. The embodiments described herein should be considered in a descriptive sense only and not for purposes of limitation. Therefore, the scope of the present disclosure should be interpreted as including all modifications or various other embodiments based on the technical concept of the present disclosure. The above embodiments are merely examples, and those of ordinary skill in the art may derive various modifications and other equivalent embodiments therefrom. Thus, the spirit and scope of the inventive concept should be defined by the following claims.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An optical lens assembly comprising:
   a first lens group having positive refractive power, an iris diaphragm, and a second lens group having positive refractive power, which are arranged from an object side to an image side of an optical axis, the object side facing an object for image capture and the image side facing an imaging surface of an image sensor,
   wherein
   the first lens group comprises a first air lens having negative refractive power and a convex surface facing the object side and a second air lens having negative refractive power and two convex surfaces,
   the second lens group comprises a lens closest to the image side of the optical axis that has positive refractive power and a convex surface facing the image side,
   the lens closest to the image side further comprises an aspherical surface, and
   the optical lens assembly has a maximum viewing angle of 130 degrees or more and satisfies the following conditions:

$-80 < Fair1/F < -5$ $-3.7 < Fair2/F < -1$ $1.8 < Fp2/F < 3.7$ where "F" denotes a focal length of the optical lens assembly, "Fair1" denotes a focal length of the first air lens, "Fair2" denotes a focal length of the second air lens, and "Fp2" denotes a focal length of the lens in the second lens group closest to the image side.

2. The optical lens assembly of claim 1, wherein the optical lens assembly further satisfies the following conditions:

$-1.0 < (R1air1 - R2air1)/(R1air1 + R2air1) < -0.1$; and $-8.0 < (R1air2 - R2air2)/(R1air2 + R2air2) < -2.0$ where "R1air1" denotes a curvature radius of a surface of the first air lens facing the object, "R2air1" denotes a curvature radius of a surface of the first air lens facing the imaging surface, "R1air2" denotes a curvature radius of a surface of the second air lens facing the object, and "R2air2" denotes a curvature radius of a surface of the second air lens facing the imaging surface.

3. The optical lens assembly of claim 1, wherein the optical lens assembly further satisfies the following condition:

$2.5 < F2/F < 5.0$ where "F2" denotes a focal length of the second lens group.

4. The optical lens assembly of claim 1, wherein the first lens group further comprises:
   a first lens having negative refractive power disposed along the optical axis adjacent to a surface of the second air lens facing the imaging surface; and
   a second lens having positive refractive power disposed along the optical axis adjacent to the first lens, wherein the second lens is an aspherical lens.

5. The optical lens assembly of claim 4, wherein the optical lens assembly further satisfies the following conditions:

$Np1 > 1.75$;

$1.0 < Fp1/F < 9$; and $Vn1 > 60$ where "Np1" denotes a refractive index of the second lens having positive refractive power in the first lens group, "Fp1" denotes a focal length of the second lens having positive refractive power in the first lens group, and "Vn1" denotes an Abbe number of the lens having negative refractive power in the first lens group.

6. The optical lens assembly of claim 1, wherein the first lens group further comprises a double-sided aspherical lens having negative refractive power, the double-sided aspherical lens satisfies the following conditions:

$-0.4 < (R1asp1 - R1bestfit1)/(R1asp1) + (R2asp1 - R2bestfit1)/(R2asp1) < 0.8$; and $0.8 < EffD2asp1/2Y < 1.3$ where "R1asp1" denotes a curvature radius of a surface of the double-sided aspherical lens facing the object, "R2asp1" denotes a curvature radius of a surface of the double-sided aspherical lens facing the imaging surface, "R1bestfit1" denotes a best-fit curvature radius of the surface of the double-sided aspherical lens facing the object, "R2bestfit1" denotes a best-fit curvature radius of the surface of the double-sided aspherical lens facing the imaging surface, "EffD2asp1" denotes an effective diameter of the surface of the double-sided aspherical lens facing the imaging surface, and "Y" denotes an image height of an image of the object captured by the image sensor.

7. The optical lens assembly of claim 1, wherein the second lens group further comprises:
   a third lens having positive refractive power disposed on the optical axis between the object and the lens closest to the imaging surface, wherein a surface of the third lens facing the object is convex; and a fourth lens having negative refractive power disposed on the optical axis between the third lens and the lens closest to the imaging surface.

8. The optical lens assembly of claim 7, wherein the third lens and the fourth lens are joined together.

9. The optical lens assembly of claim 1, wherein the second lens group comprises at least one lens having positive refractive power and at least one lens having negative refractive power and satisfies the following conditions:

$$N2p-N2n<-0.1; \text{ and}$$

$$30<V2p-V2n$$

where "N2p" denotes a refractive index of a lens having positive refractive power and a smallest refractive power in the second lens group, "N2n" denotes a refractive index of a lens having negative refractive power and a greatest refractive power in the second lens group, "V2p" denotes an Abbe number of the lens having positive refractive power and the smallest refractive power in the second lens group, and "V2n" denotes an Abbe number of the lens having negative refractive power and the greatest refractive power in the second lens group.

10. The optical lens assembly of claim 1, wherein the second lens group further comprises a triple junction lens disposed on the optical axis between the object and the lens closest to the imaging surface, and wherein a middle lens of the triple junction lens comprises a resin.

11. The optical lens assembly of claim 1, wherein the optical lens assembly further satisfies the following conditions:

$$0.8<(dY/d\theta)(\theta)/(dY/d\theta)(0)<1.2; \text{ and}$$

$$0 \le \theta \le (FOV/2)$$

where "FOV" denotes a maximum viewing angle of the optical lens assembly, and "$dY/d\theta(\theta)$" denotes a first-order differential function for $\theta$ with respect to a function $Y=f(\theta)$, wherein the function $Y=f(\theta)$ is a mapping function between a viewing angle $\theta$ and an image height Y of an image of the object captured by the image sensor.

12. The optical lens assembly of claim 1, wherein the optical lens assembly further satisfies the following conditions:

$$|RayAngle1/(FOV/2)|<0.4; \text{ and}$$

$$|RayAngle2/(FOV/2)|<0.13$$

where "FOV" denotes a maximum viewing angle of the optical lens assembly, "RayAngle1" denotes an angle at which a chief ray among rays formed at a maximum image height passes through the iris diaphragm, and "RayAngle2" denotes an angle at which the chief ray is incident on the imaging surface.

13. The optical lens assembly of claim 1, wherein an air gap in the first lens group forms a third air lens having positive refractive power and a convex surface facing the object.

14. The optical lens assembly of claim 1, wherein the first air lens is an air gap between two meniscus lenses each having a convex surface facing the object.

15. The optical lens assembly of claim 1, wherein the second air lens is an air gap between a biconcave lens and a meniscus lens, the meniscus lens having a convex surface facing the object.

16. The optical lens assembly of claim 1, wherein the second air lens is an air gap between a first meniscus lens and a second meniscus lens, the first meniscus lens having a convex surface facing the object, and the second meniscus lens having a convex surface facing the imaging surface.

17. An optical lens assembly comprising:
a first lens group having negative refractive power, an iris diaphragm, and a second lens group having positive refractive power, which are arranged from an object side to an image side of an optical axis, the object side facing an object for image capture and the image side facing an imaging surface of an image sensor,
wherein
the first lens group comprises a first air lens having negative refractive power and a convex surface facing the object side, a second air lens having negative refractive power and two convex surfaces, a lens having negative refractive power on an image side of the second air lens, and an aspherical lens having positive refractive power,
the second lens group comprises a lens closest to the image side of the optical axis that has positive refractive power and a convex surface facing the image side,
the lens closest to the image side further comprises an aspherical surface, and
the optical lens assembly has a maximum viewing angle of 130 degrees or more and satisfies the following conditions:

$$-80<F\text{air}1/F<-5$$

$$-3.7<F\text{air}2/F<-1$$

$$1.0<Fp1/F<9.0$$

$$Vn1>60$$

where "F" denotes a focal length of the optical lens assembly, "Fair1" denotes a focal length of the first air lens, "Fair2" denotes a focal length of the second air lens, "Fp1" denotes a focal length of the aspherical lens of the first lens group, and "Vn1" denotes an Abbe number of the lens having negative refractive power in the first lens group.

18. The optical lens assembly of claim 17, wherein the optical lens assembly satisfies the following conditions:

$$-1.0<(R1\text{air}1-R2\text{air}1)/(R1\text{air}1+R2\text{air}1)<-0.1$$

$$-8.0<(R1\text{air}2-R2\text{air}2)/(R1\text{air}2+R2\text{air}2)<-2.0$$

where "R1air1" denotes a curvature radius of a surface of the first air lens facing the object, "R2air1" denotes a curvature radius of a surface of the first air lens facing the imaging surface, "R1air2" denotes a curvature radius of a surface of the second air lens facing the object, and "R2air2" denotes a curvature radius of a surface of the second air lens facing the imaging surface.

19. The optical lens assembly of claim 17, wherein the optical lens assembly satisfies the following condition:

$$2.5<F2/F<5.0$$

where "F2" denotes a focal length of the second lens group.

20. An electronic apparatus comprising:
at least one optical lens assembly; and
an image sensor configured to receive light formed by the at least one optical lens assembly, wherein the at least one optical lens assembly comprises a first lens group having positive refractive power, an iris diaphragm, and a second lens group having negative refractive power, which are arranged from an object side to an image side of an optical axis, the object side facing an object for image capture and the image side facing an imaging surface of an image sensor, the first lens group comprises a first air lens having negative refractive power and a convex surface facing the object side and a second air lens having negative refractive power and two convex surfaces, the second lens group comprises a lens closest to the image side of the optical axis that has positive refractive power and a convex surface facing the image side, the lens closest to the image side further comprises an aspherical surface, and the optical lens assembly has a maximum viewing angle of 130 degrees or more and satisfies the following conditions:

$$-80 < Fair1/F < -5$$

$$-3.7 < Fair2/F < -1$$

$$1.8 < Fp2/F < 3.7$$

where "F" denotes a focal length of the optical lens assembly, "Fair1" denotes a focal length of the first air lens, "Fair2" denotes a focal length of the second air lens, and "Fp2" denotes a focal length of the lens in the second lens group closest to the image side.

21. The electronic apparatus of claim 20, wherein the electronic apparatus comprises no more than two optical lens assemblies to capture an omnidirectional spherical image.

* * * * *